US011153786B2

(12) United States Patent
Torres et al.

(10) Patent No.: US 11,153,786 B2
(45) Date of Patent: Oct. 19, 2021

(54) SYSTEM AND METHOD FOR BANDWIDTH PROFILE BASED ALLOCATION AND MANAGEMENT OF A TIME-VARYING TOPOLOGY NETWORK

(71) Applicant: Hughes Network Systems, LLC, Germantown, MD (US)

(72) Inventors: Robert James Torres, New Market, MD (US); Stanley Edward Kay, Rockville, MD (US); George Choquette, Potomac, MD (US)

(73) Assignee: Hughes Network Systems, LLC., Germantown, MD (US)

( * ) Notice: Subject to any disclaimer, the term of this patent is extended or adjusted under 35 U.S.C. 154(b) by 0 days.

(21) Appl. No.: 16/729,426

(22) Filed: Dec. 29, 2019

(65) Prior Publication Data

US 2020/0137633 A1  Apr. 30, 2020

Related U.S. Application Data

(63) Continuation of application No. 15/723,127, filed on Oct. 2, 2017, now Pat. No. 10,560,874.
(Continued)

(51) Int. Cl.
*H04W 28/24* (2009.01)
*H04B 7/185* (2006.01)
(Continued)

(52) U.S. Cl.
CPC ........ *H04W 28/24* (2013.01); *H04B 7/18519* (2013.01); *H04B 7/18521* (2013.01);
(Continued)

(58) Field of Classification Search
CPC ..... H04W 28/24; H04W 28/02; H04W 24/10; H04W 28/0289; H04W 28/10;
(Continued)

(56) References Cited

U.S. PATENT DOCUMENTS 5,579,307 A   11/1996  Richetta et al.
6,366,761 B1   4/2002  Montpetit
(Continued)

OTHER PUBLICATIONS

International Search Report and Written Opinion dated Jan. 5, 2018 by the International Searching Authority (European Patent Office) in PCT Application PCT/US2017/054797.
(Continued)

*Primary Examiner* — Kwang B Yao
*Assistant Examiner* — Syed M Bokhari
(74) *Attorney, Agent, or Firm* — NovoTechIP International PLLC

(57) ABSTRACT

Disclosed methods include a resource manager in a multiple node network receiving a demand for additional bandwidth, from a terminal, and the resource manager having updated information on the state of the mobile node network and, using that the state information, performing test allocation of the requested bandwidth to the requesting terminal. Disclosed methods include determining whether previous commitments of service can be met with the test allocation in place. Associated with a positive result, an allocation is sent to the terminal.

17 Claims, 9 Drawing Sheets

Related U.S. Application Data

(60) Provisional application No. 62/402,919, filed on Sep. 30, 2016.

(51) Int. Cl.
    *H04B 7/195*    (2006.01)
    *H04W 28/02*    (2009.01)
    *H04L 12/911*   (2013.01)
    *H04L 12/923*   (2013.01)
    *H04W 24/10*    (2009.01)
    *H04W 28/10*    (2009.01)
    *H04L 12/24*    (2006.01)
    *H04L 12/801*   (2013.01)

(52) U.S. Cl.
    CPC ......... *H04B 7/18584* (2013.01); *H04B 7/195* (2013.01); *H04L 47/762* (2013.01); *H04L 47/823* (2013.01); *H04W 24/10* (2013.01); *H04W 28/02* (2013.01); *H04W 28/0289* (2013.01); *H04W 28/10* (2013.01); *H04L 41/0896* (2013.01); *H04L 47/14* (2013.01); *H04W 28/0268* (2013.01)

(58) Field of Classification Search
    CPC ........... H04W 28/0268; H04B 7/18521; H04B 7/18584; H04B 7/195; H04B 7/18519; H04L 47/823; H04L 47/762; H04L 41/0896; H04L 47/14
    USPC .................. 370/329, 316, 337, 336, 394
    See application file for complete search history.

(56) References Cited

U.S. PATENT DOCUMENTS

| | | |
|---|---|---|
| 8,159,964 B2 | 4/2012 | Agarwal |
| 8,432,805 B2 | 4/2013 | Agarwal |
| 8,442,030 B2 | 5/2013 | Dennison |
| 8,634,296 B2 | 1/2014 | Agarwal |
| 9,094,856 B1 | 7/2015 | Tian et al. |
| 9,118,455 B2 | 8/2015 | Agarwal |
| 2003/0035385 A1* | 2/2003 | Walsh ................ H04B 7/18586 370/316 |
| 2008/0019371 A1* | 1/2008 | Anschutz ................ H04L 47/10 370/394 |
| 2012/0213210 A1* | 8/2012 | Thomasson ........ H04B 7/18528 370/337 |
| 2013/0135996 A1 | 5/2013 | Torres et al. |
| 2015/0282003 A1* | 10/2015 | Noerpel ................ H04L 5/0058 370/236 |
| 2016/0072691 A1 | 3/2016 | Xu et al. |
| 2016/0183126 A1 | 6/2016 | Roy et al. |

OTHER PUBLICATIONS

European Office Action dated Oct. 21, 2020 in corresponding European Application 17785122.7.

Brazilian Office Action published Sep. 29, 2020 in corresponding Brazilian Application BR1120190065270 (with English Translation).

* cited by examiner

SYSTEM AND METHOD FOR BANDWIDTH PROFILE BASED ALLOCATION AND MANAGEMENT OF A TIME-VARYING TOPOLOGY NETWORK

CROSS REFERENCE TO RELATED APPLICATIONS

This application is a continuation of pending U.S. patent application Ser. No. 15/723,127, filed Oct. 2, 2017, and entitled "SYSTEM AND METHOD FOR BANDWIDTH PROFILE BASED ALLOCATION AND MANAGEMENT OF A TIME-VARYING TOPOLOGY NETWORK," which claimed a benefit of priority to U.S. Provisional Patent Application Ser. No. 62/402,919 filed Sep. 30, 2016, and entitled "SYSTEM AND METHOD FOR BANDWIDTH PROFILE BASED ALLOCATION AND MANAGEMENT OF A TIME-VARYING TOPOLOGY NETWORK." All of the foregoing applications are incorporated by reference herein in their entireties.

BACKGROUND

Low Earth Orbiting (LEO) satellite networks employ a population of satellites orbiting the Earth at a height, for example, of approximately 100 miles to 1000 miles or higher, with a speed that constantly moves their position relative to the earth surface. Communications from a source terminal to a destination terminal can consist of an uplink transmission from the source to a LEO satellite, for forwarding through a succession of satellite-to-satellite links (also termed "inter satellite" or "ISL"), for downlink by a satellite that is in view of the destination terminal.

LEO satellite networks can provide certain advantages over geostationary earth orbit GEO satellite networks. For example, GEO satellites are positioned approximately 22,200 miles above sea level. Transmitting high bandwidth signals over such distance consumes significant power and, even at the speed radio waves travel, requires substantial time. One "hop," meaning a "bent-elbow" transmission from the ground to the GEO satellite and back down is a 44,000 mile trip, which requires approximately 250 milliseconds. In certain applications, 250 milliseconds of delay can degrade communication quality.

Communication using a LEO satellite network, in contrast, because of the satellites' low height, consumes far less transmission power. In addition, even when a signal requires multiple hop forwarding through a LEO network to reach its destination, delay from transmission to reception can be substantially less than in GEO systems.

LEO satellite networks, though, have particular complexities that can impose substantial costs in implementation. One large complexity is that unlike a GEO network the topology of a LEO network undergoes constant change. As one illustration, from the perspective of a terminal, the satellites(s) it has in view and can therefore connect to, for uplink, downlink, or both, can change every several minutes. Likewise, from the perspective of any of the satellites, its neighbors are temporary, and therefore ISLs to those neighbors have only a temporary existence. This can contribute to ISL congestion. One result of the changing conditions and topology is that a costly percentage of packets are admitted to the network but dropped, for example, at one of the satellites or at an egress terminal. There can be a secondary cost associated with each dropped packet, namely, the bandwidth of the LEO network that was consumed in the interval from being admitted to being dropped or lost.

Improvements in LEO and other mobile node network bandwidth management are therefore needed, for example, in terms of greater average utilization of uplinks, downlinks, and ISLs, and significant reduction in the admission of packets that, ultimately, will be dropped or lost.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
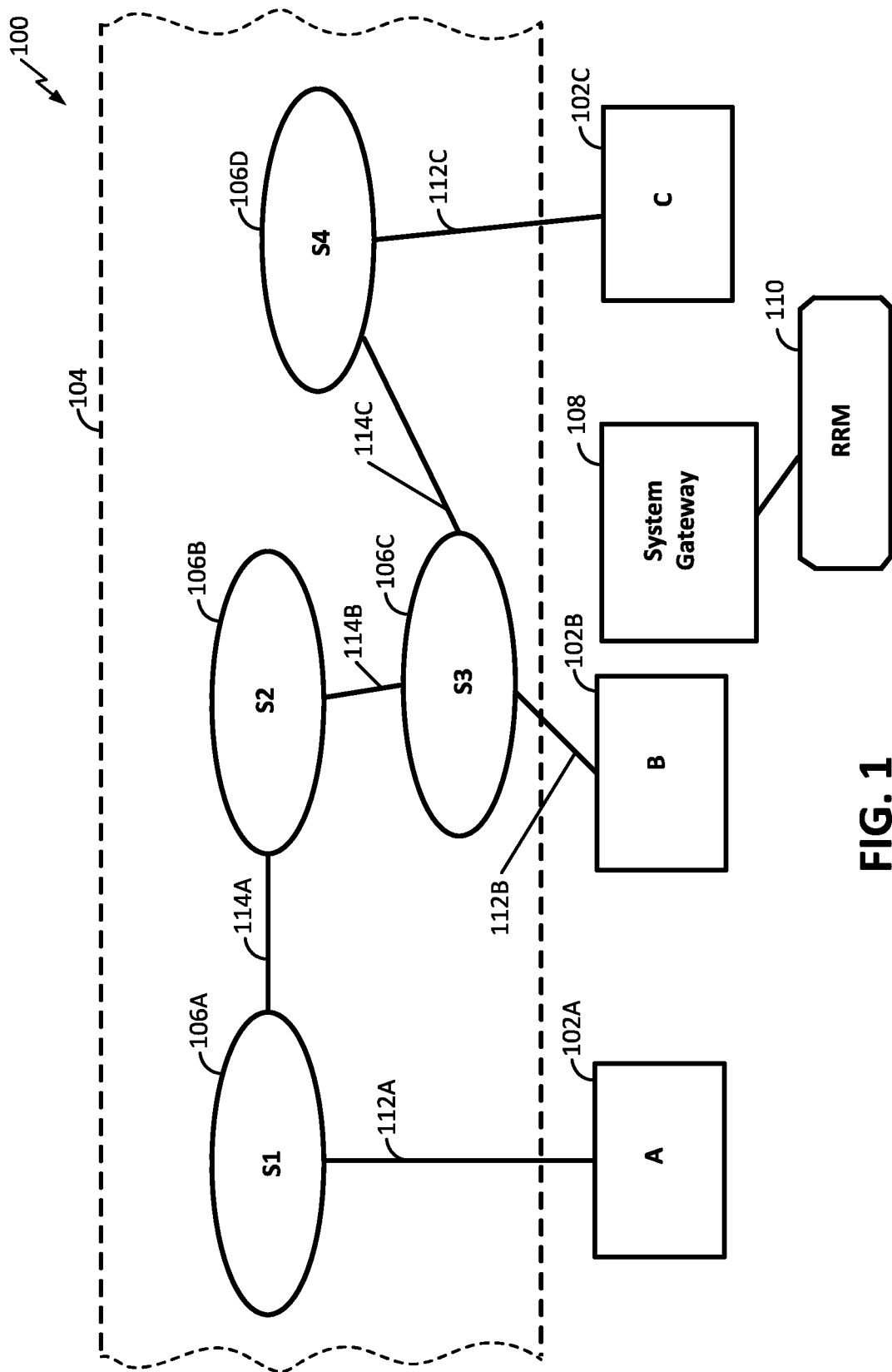
FIG. 1 illustrates a simplified diagram of a portion of one example of a non-stationary topology, mobile node network system according to various implementations.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following terms, as used herein, have a meaning that includes, but is not limited to, the following stated meaning(s) and/or given examples, whichever a larger scope, except in instances where made clear from the term's context that a different meaning is intended:

"mobile node network" means a network of nodes having non-stationary spatial position and includes, but is not limited to, a LEO satellite network;

"terminal" means a device, for example but not limited to a terrestrial device, capable of having a subscription, of requesting demands, of being given allocations, and of accessing the mobile node network via an edge node;

"edge node" means mobile node, for example but not limited to, a LEO satellite, that currently has an uplink and a downlink to one or more terminals as well as having inter-node links, for example, ISLs, to other neighbor mobile nodes;

"mobile node" means a mobile node, without limitation as to being or not being an edge node for one or more terminals;

"edge" means a link that is any from among an inter-node link, e.g., an ISL, an uplink, and a downlink, that connects mobile nodes to one another, and/or terminals to edge nodes;

"processor" means one or more processors, and encompasses distributed processing resources; and "memory" means one or more memories, and encompasses processor internal memory, distributed memory resources, and databases.

In one general implementation, a plurality of ground terminals in a multiple moving node network, for example a LEO satellite based network, can each establish uplinks to and receive downlinks from respective ones of the mobile nodes. Each of the ground terminals can receive packets, the packets having respective destinations. The ground terminals, in response, can enqueue at least a sub-plurality of the packets, and can then dequeue and transmit the enqueued packets, over their respective uplinks, using a priority that is based at least in part on the packet's respective destinations.

In an implementation, one of the packets can have respective indicators of a level of a quality-of-service, among a plurality of levels. In such an implementation, the terminal's enqueuing of the packets can include queuing into a particular queue among multiple queues, according to the level of the quality of service. This can be performed, for example, using virtual queuing techniques. Further, in such implementations, the priority the terminals apply in dequeuing and transmitting the packets is further based, at least in part, on which of the multiple queues in which the packets are queued. Accordingly, when a terminal receives different packets to different destinations, and enqueues these for transmission, the terminal can then dequeue and transmit packets to one destination with a higher priority than packets to another destination. In an aspect, the per-destination priorities may be determined by a resource manager. Implementations can include providing the resource manager with network state information including, but not limited to, congestion points and utilization of links and mobile nodes, and the resource manager can use these in bandwidth management/assignment.

In an implementation, the terminals can be configured to include in their enqueuing of packets one or more qualifying operations. The qualifying operations can include applying an ingress bandwidth profile, the ingress bandwidth profile having a qualification parameter. One example qualification parameter can be a packet burst parameter. Such implementations can also include the terminals discarding packets not meeting the qualification parameter.

Implementations can also include the qualification parameter being a first qualification parameter, and the ingress bandwidth profile including a second qualification parameter. The second ingress bandwidth parameter can reflect, for example, a committed traffic rate parameter. In an implementation, the terminals can be configured to include in applying the ingress bandwidth profile a marking of packets that concurrently meet the first qualification parameter and do not meet the second qualification parameter. Such implementations can include configuring the terminals to determine and apply a priority applied in dequeuing and transmitting the packets that is further based on whether the packets are marked.

FIG. 1 illustrates a high-level block diagram of one example implementation of a bandwidth-managed mobile node network system 100 according to various aspects. To avoid repeated recitation of its name, the bandwidth-managed mobile node network 100 will be referred to as "network system 100." In an implementation, the network system 100 can include a plurality of Terminals, such as the example Terminals 102A, 102B and 102C, that transmit packets to each other through an ephemerally interlinked ("EI") mobile node network 104. It will be understood that "ephemerally interlinked" and its abbreviation "EI" are, respectively, a coined name and arbitrary abbreviation for same, introduced here for convenient reference to item 104 in describing example operations, and have no intrinsic or limitative meaning. With continuing reference to FIG. 1, the EI mobile node network 104 can be implemented with a population of mobile nodes, such as the Nodes 106A, 106B, 106C, and 106D that can interface, through Gateway 108, with a Resource Manager 110. For brevity, generic reference to Terminals 102A, 102B and 102C will in some instances use the term "Terminal(s) 102," and generic reference to nodes 106A, 106B, 106C, and 106D will in some instances use the term "Node(s) 106."

Referring to FIG. 1, it will be understood that the Nodes 106 can represent a portion of a larger population of mobile Nodes, which can be moving in respective paths that, except for preferably not colliding with one another, can be independent. The movement can form a time-varying pattern of node positions. Accordingly, FIG. 1 can represent a snapshot, and the Nodes 106 that appear in FIG. 1 can be the particular ones of the larger population that, at that snapshot, are geographically proximal to one of the Terminals 102 in the figure. It will be understood that, if a snapshot showing Terminals 102 were taken from the same perspective at a future time, that the specific Nodes 106 in FIG. 1 may not be 106A, 106B, 106C, and 106D. For purposes of description, the "constellation" will be term referring to the state of the entire population of mobile Nodes of which Nodes 106 are part, including their respective positions, and all the "node-to-node" connections in place at the time. However, "constellation" is not the exclusive term that this disclosure uses for this state.

In an implementation, each Node 106 can be configured as capable of forming temporary node-to-node links with other Nodes 106, subject to proximity and available capacity constraints. For any Node 106, each Node 106 with which it has a direct ISL connection can be referred to as a "neighbor Node 106." As examples, referring to FIG. 1, Node 106A and Node 106B are neighboring nodes as shown by their mutual connection through node-to-node link 114A. In contrast, Nodes 106A and 106C, in the snapshot of the network system 100 visible in FIG. 1, are not neighbors. Duration of node-to-node links 114 depends, for example, on respective orbits of the Nodes 106, their relative speed, and the range of their transmitters. One example can be approximately 5 to 10 minutes.

In an implementation, it may be preferable that each Terminal 102 has a continuous, or substantially continuous connection to the EI mobile node network 104 via at least one edge node, allowing uplink and/or downlink data communication via the EI mobile node network 104 with other Terminals 102, Gateway 108, or other network-accessible resources. In the snapshot illustrated by FIG. 1, the edge node for Terminal 102A is Node 106A, the edge node for Terminal 102D is Node 106C, and the edge node for Terminal 102C is Node 106D. In a subsequent snapshot, for each of the Terminals 102, another one or more of the Nodes 106 will be an edge node.

Terminals 102 and Nodes 106 can be, but are not necessarily, implemented respectively as very small aperture terminals ("VSAT"), and payloads of LEO satellites. Examples of VSAT implementations of Terminals 102 and of LEO satellite implementations of Nodes 106 are described in greater detail, for example, in reference to FIGS. 2, 3, and 4, and elsewhere in this disclosure.

Referring to FIG. 1, in one general implementation, the Radio Resource Manager 110 (hereinafter "Resource Manager" 110) is configured to store data reflecting a current state of the constellation and ground connectivity needs, and to update the data based on inputs or reports, or both, from the Gateway 108, and the Terminals 102 and Nodes 106, either directly or via the Gateway 108. The Resource Manager 110 can be further configured to determine, based on the current state of the constellation and on the inputs or reports, or both, from the Terminals 102, Gateway, or Nodes 106, new allocations of resources and new operational parameters, and to provide the new allocations and operational parameters to Nodes 106, the Terminals 102, and the Gateway(s) 108. In a general implementation, the capabilities of Resource Manager 110 to store data reflecting a current state of the constellation and ground connectivity needs, and to update the data based on inputs or reports, or both, can provide a feature of "awareness," in a machine knowledge sense, of information reflecting the current state of the constellation and ground connectivity needs. In a general implementation the Resource Manager 110 can include in its awareness the capabilities and capacities of the Terminals 102 and the Gateway 108, as well as the current ingress bandwidth profiles and egress bandwidth profiles, and respective demand for communication services of the Terminals 102 and the Gateway 108. As will be understood by persons of ordinary skill from reading this disclosure, the Gateway 108 and its arrangements in the network system 100 provide that Resource Manager 110 need not communicate directly with the Nodes 106. In an implementation, the Resource Manager 110 can be configured to receive new demand requests from Terminals 102, or from the Gateway 108, or both, and based on the demand requests in combination with the above-described awareness feature, determine if new allocations are needed and, if so, provide the allocations to the Terminals 102, or to the Gateway(s). Regarding aspects of determining and providing allocations, implementations of the Resource Manager 110 can include configuration that particularly determine and break down bandwidth allocations according to priority or Quality of Service (QoS), or Class of Service (COS), and can include per-destination caps. As will be appreciated by persons of skill upon reading this disclosure, features and benefits provided by such determination and provision of bandwidth allocations and per-destination caps can include, but are not limited to, significant reduction in the rate or quantity of packets admitted to the network system 100 only to be dropped, as well as reduction in frequency and effects of congestion.

As to awareness of the state of the EI mobile node network 104, example information provided to, maintained or otherwise available to the Resource Manager 110 can include, but is not limited to, positions of the Nodes 106, current routing tables (not visible in FIG. 1) for the Nodes 106, and current allocations of bandwidth, with breakdown according to priority level, for the Terminals 102. In some implementations, the Resource Manager 110 can receive information about the Nodes 106 sufficient to determine, for example, effective and/or estimated node-to-node link utilization and availability. Such information can include, but is not limited to, telemetry data. In an implementation, the Resource Manager 110 can also receive, directly or through the Gateway 108, information indicative of data transmission requests (not visible in FIG. 1) from customers (not visible in FIG. 1) using the Terminals 102. Aspects and various examples of such requests are described in greater detail in later sections of this disclosure.

In an implementation, the Resource Manager 110 can be configured to determine allocations for the Terminals 102, based at least in part on its awareness of the state of the network system 100 (e.g., determined effective and/or estimated node-to-node link utilization and available capacity), combined with its received information on bandwidth/priority demands from the Terminals 102, and to send corresponding allocations to the Terminals 102. An example of operations illustrating these features is described in reference to Tables 1-17 later in this disclosure.

In an implementation, the Resource Manager 110 can be configured to re-determine effective and/or estimated node-to-node link utilization and available capacity at certain defined times, which can be periodic, or event-driven, or both.

Figure 2:
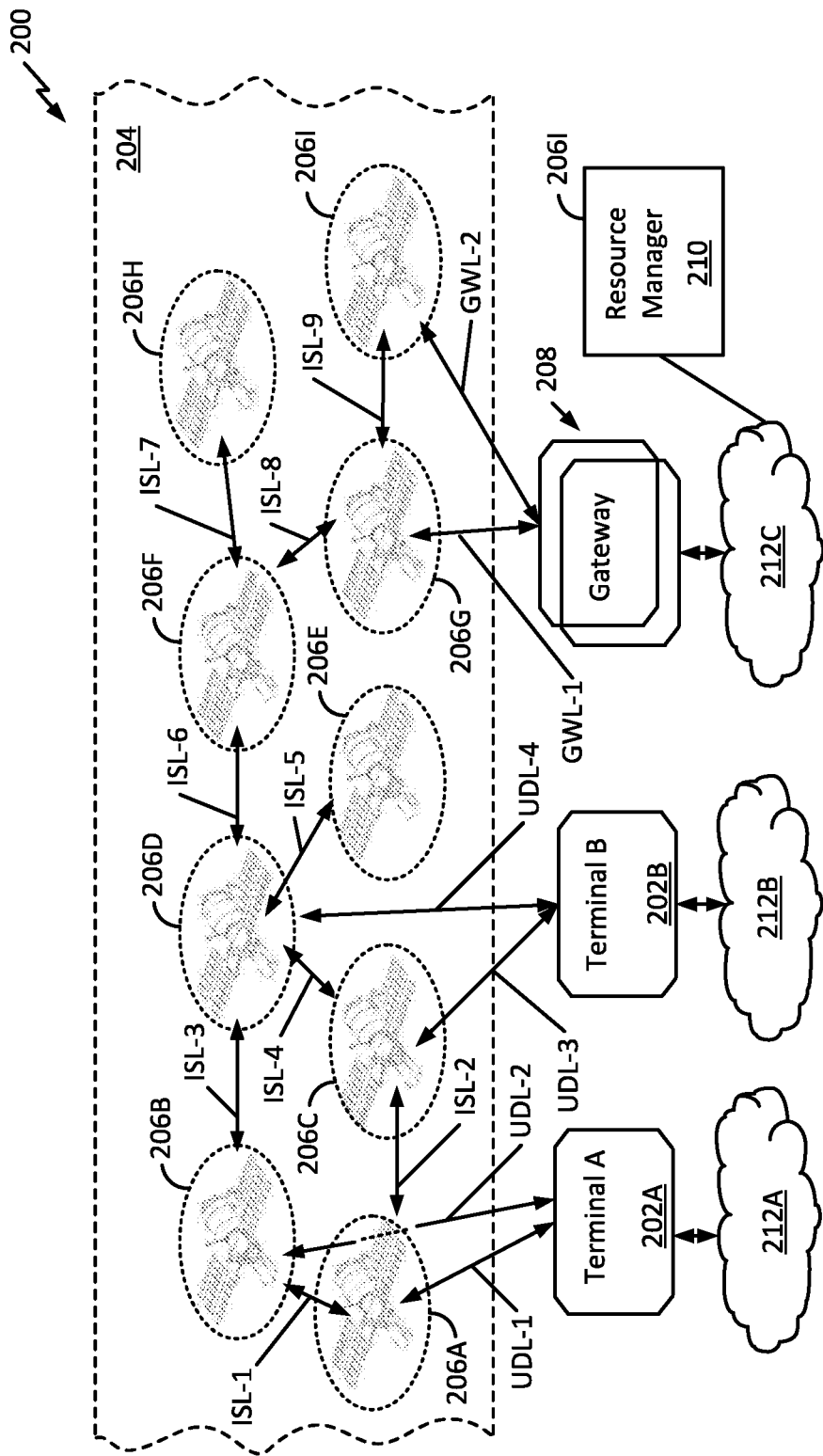
FIG. 2 illustrates a diagram of a portion of an example LEO satellite implementation of another moving topology, multiple node network system according to various implementations.
Figure 4:
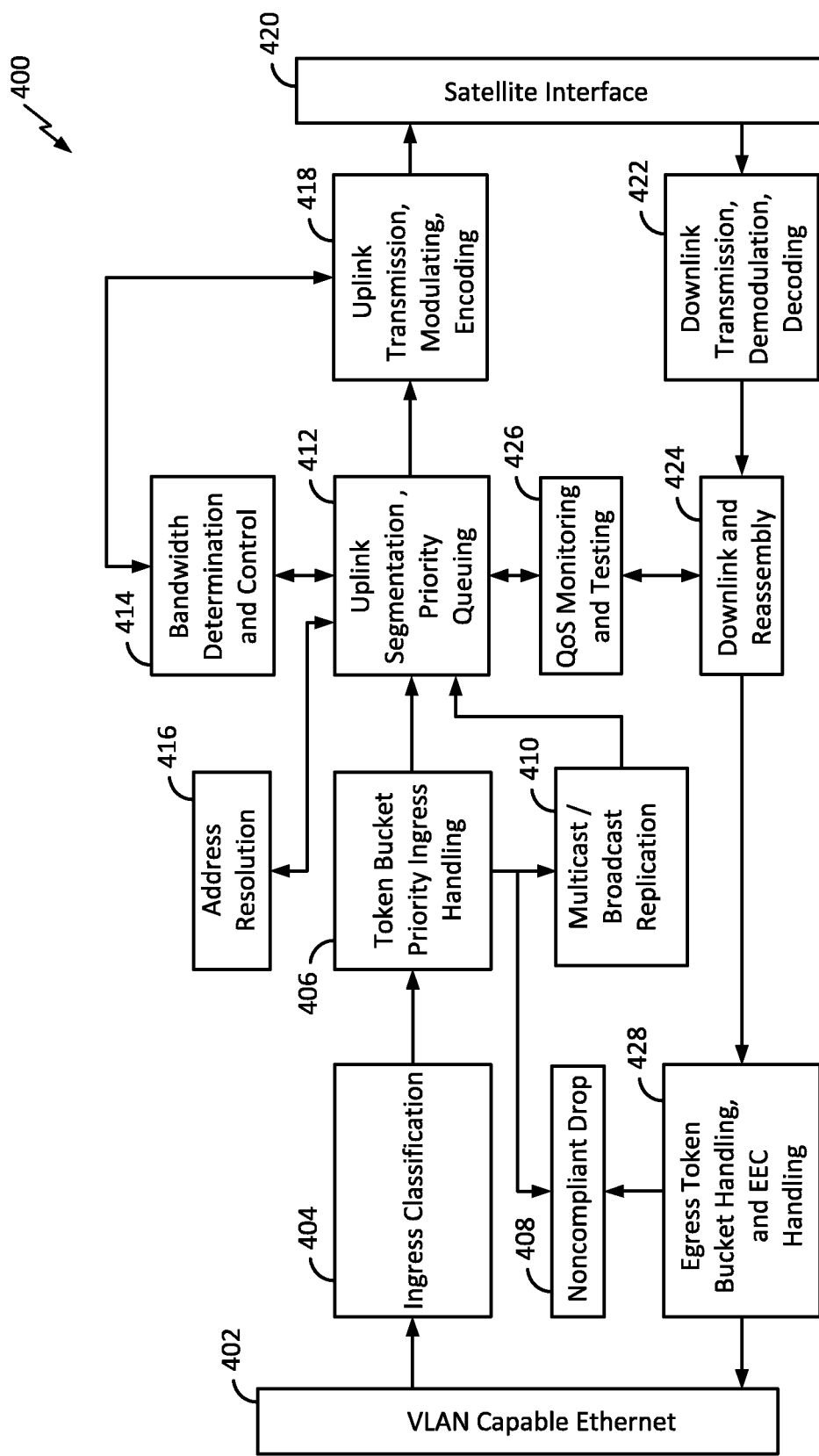
FIG. 4 illustrates a logical block diagram of an example a multiple queue, bandwidth profile terminal for an exemplary LEO satellite implementation of a moving topology, multiple node network system according to various implementations.
Figure 5:
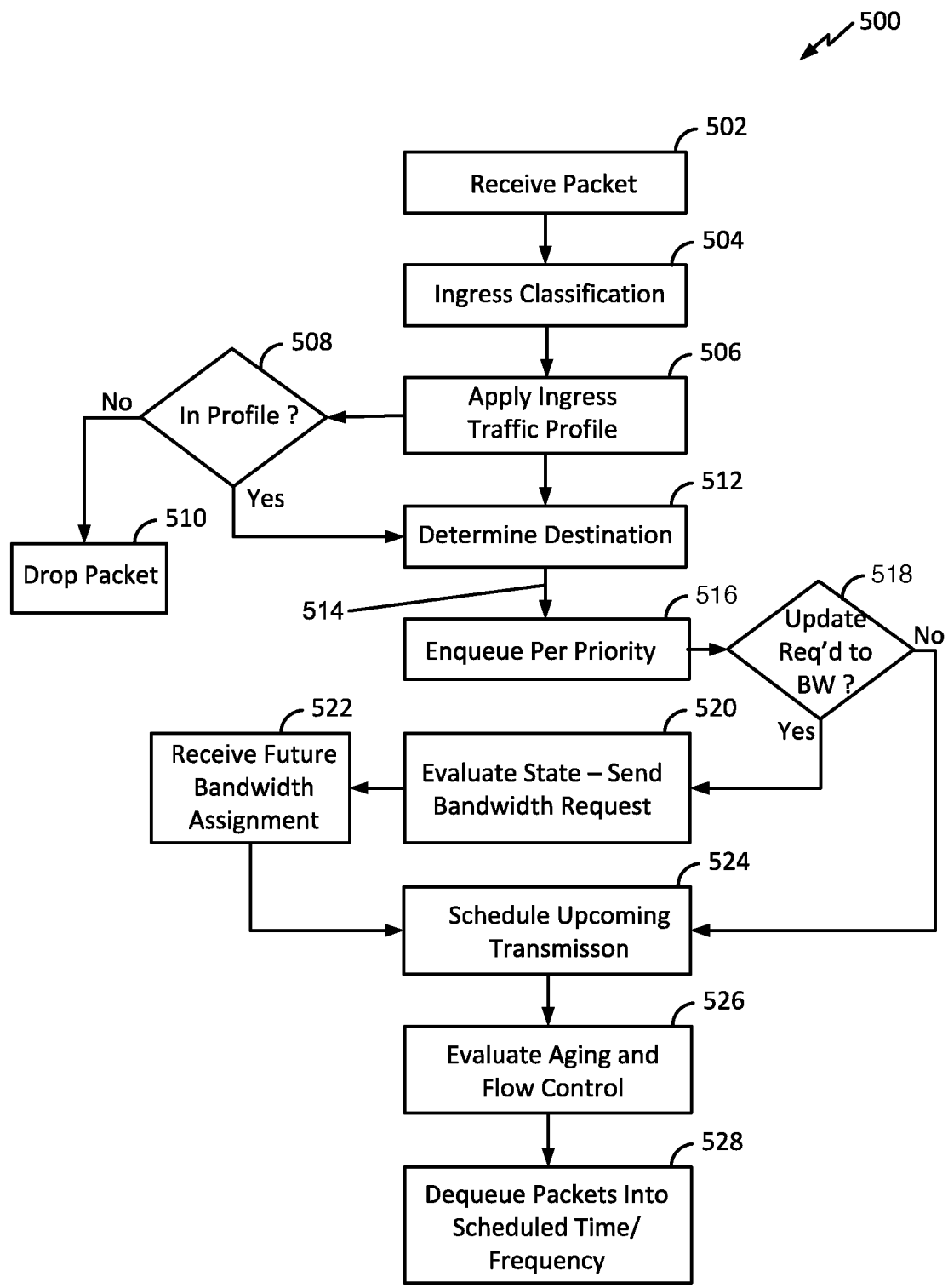
FIG. 5 illustrates one logical flow of example operations that can be applied by the terminals, such as the FIG. 1 Terminals, or the FIG. 2 Terminals.

Regarding Terminals 102, various features, aspects, and implementations thereof are described in greater detail in reference to FIGS. 2, 4, and 5, and elsewhere. In an implementation, each Terminal 102 can be assigned, and can keep a local copy or representation or link to an "ingress bandwidth profile" (not visible in FIG. 1) and an "egress bandwidth profile" (not visible in FIG. 1). For convenience in describing various features and operations, the term "bandwidth profile" is used herein as a collective reference to ingress bandwidth profile and egress bandwidth profile. It will be understood that "bandwidth profile," as used herein, has no meaning other than being a collective reference to ingress bandwidth profile and egress bandwidth profile.

In one or more implementations, bandwidth profiles generated by the Resource Manager 110, and stored or otherwise accessible to the Terminals 102, can be, but are not necessarily according to or in conformance with Metro Ethernet Forum (MEF), Technical Specification MEF 10.3, Ethernet Services Attributes, Phase 3 (October 2013) ("MEF Technical Specification 10.3"), which is hereby incorporated by reference, in its entirety. It will be understood that the MEF Technical Specification 10.3 is only one example, and does not limit the scope of formats, specifications and representations of bandwidth allocation that can be used in practices according to disclosed aspects. It will instead be understood that practices according to disclosed aspects can apply or use any bandwidth profile or differently named equivalent that provides for guaranteed/committed and best effort traffic, across priorities.

In an implementation, one example "ingress bandwidth profile" that may be provided to and updated, and stored in or otherwise accessible by the Terminals 102 (or the Terminals 202 described in greater detail later), can include a particular set of parameters, or set of switches, or both. One example set of such parameters can be termed, for purposes of description, "ingress bandwidth profile parameters." One example set of such switches can be termed, also for purposes of description, "ingress bandwidth profile switches." One non-limiting example set of ingress bandwidth profile parameters can include, identified here, for convenience, using MEF Specification 10.3 terminology, CIR—committed information rate;
CBS—committed burst size;
EIR—excess information rate; and
EBS—excess burst size.

One example set of ingress bandwidth profile switches can include the following, identified here, for convenience, using MEF Specification 10.3 terminology:
 CF—on or off; and
 CM—color-blind or color aware.

Regarding the example CF switch, in an implementation, functionality can include:
 Within a class-of-service (COS), can determine whether excess committed tokens in the green token bucket (>CBS) can flow into the excess yellow token bucket; and
 Across a COS, can determine whether excess green tokens from the lowest COS can flow into a highest class yellow token bucket.

Regarding the CM switch, in an implementation functionality can include: determining whether the Terminal 102 (or Terminal 202) looks at already marked packets such that an already marked yellow packet is applied only to the yellow token bucket.

FIG. 2 illustrates a block diagram of one example implementation of a bandwidth-managed LEO network system 200 according to various aspects. To avoid repeated recitation of its name, the bandwidth-managed LEO network 200 will be referred to as "LEO network system 200." The LEO network system 200 network can include a plurality of Terminals, such as the Terminals 202A and 202B (generically referenced, in the alternative, as "Terminals 202"), capable of transmitting packets to, and receiving packets from an ephemerally interlinked ("EI") LEO network 204 (which may also be referred to as an "EI mobile node network"). The EI LEO network 204 can include a population of LEO satellites, such as the example LEO satellite nodes 206A, 206B, . . . 206I (generically referenced, in the alternative, as "LEO satellite nodes 206"), and these can interface via Gateway(s) 208 with a Resource Manager 210. The LEO satellite nodes 206 may be referred to as "mobile nodes."

In an implementation, each LEO satellite Node 206 can be configured to establish and tear down inter-satellite links (ISLs), such as the example ISLs labeled ISL-1, ISL-2, ISL-3 . . . ISL-9, and to establish and participate in tear down of uplink/downlink beams with Terminals 202, and/or the Gateways(s) 208. FIG. 2 shows example uplink/downlink beam UDL-1 between Terminal 202A and Node 206A, as well as UDL-2 between Terminal 202A and Node 206B, UDL-3 between Terminal 202B and Node 206C, and UDL-4 between Terminal 202B and Node 206D. For brevity, "uplink/downlink beam(s) UDL" will be used for generic reference to UDL1, UDL-2, UDL-3 and UDL4. FIG. 2 shows example uplink/downlink beam GWL-1 between the Gateway(s) 208, or one of the Gateway(s) 208 and Node 206G, and GWL-2 between the Gateway(s) 208, or one of the Gateway(s) 208 and Node 206I.

It will be understood that the LEO satellite Nodes 206 can be Low Earth Orbit satellites, in multiple planes and orbits. The LEO satellite Nodes 206 can thus form a moving constellation of network nodes whose position relative to each other changes over time and whose position relative to the ground, including relative to the Terminals 202 also changes over time. Associated with this movement, each LEO satellite Node 206 can service, over time, a succession of uplink/downlink beams, and a succession of ISLs with a corresponding succession of different neighboring LEO satellite Nodes 206. Path and routing options, and capabilities, at each LEO satellite Node 206 can therefore change over time. With respect to uplink/downlinks, in addition to servicing a succession of different uplink/downlink beams, qualities (e.g., interference, bandwidth, propagation phenomena) of such beams can be time varying. For example, weather conditions, terrestrial interference, satellite interference, and frequencies that can and cannot be used, can differ with geographic locations.

In an implementation, the Resource Manager 210 can be configured to periodically determine, based on a set of inputs described in greater detail later, link congestion for each ISL and each LEO satellite Node 206, for a plurality of time periods into the near future. The Resource Manager 210 can define paths, from any Terminal 202 as a start or sending terminal to any other among the Terminals 202 (or back to the same Terminal 202)—whether shown or not shown in FIG. 2—as a destination terminal. In an aspect, "paths" can include, as one example, an uplink beam UDL, a sequence of one or more ISLs connected by LEO satellite Nodes 206, and a downlink beam UDL. Another example "path" can include, effectively spliced in the sequence of one or more ISLs connected by LEO satellites, a downlink to the Gateway(s) 208, and uplink from the Gateway(s) back up to the EI LEO network 204. The Resource Manager 210, using its determination of link congestion for each ISL and each LEO satellite Node 206, can determine effective and/or estimated path congestion and bandwidth utilization along each of the paths.

In an implementation, the LEO network system 200 can be configured such that the Resource Manager 210 re-determines ISL utilization and available capacity at time intervals that will be referred to as "time ticks." It will be understood that the time ticks can be periodic, or can be event-driven, or can be both. In an implementation, the Resource Manager 210 can be configured to determine and provide new bandwidth allocations, new per-destination limitations, or both to Terminals 202 and Gateway(s) 208, for example, that cover a period of time extending over a plurality of time ticks (although the allocations and/or limitations may vary for a Terminal over that period of time), or in response to a significant change in demand at every M time ticks, or when there is significant change in demand.

As described, in an implementation, the Resource Manager 210 can be configured to allocate bandwidth to each Terminal 202 based on uplink spectrum and mobile node (e.g., LEO satellite) that is servicing that Terminal's uplink, destination (egress) information, demand from other Terminals 202 sharing the bandwidth, priority and destination information, and recently determined effective and/or estimated path utilization of the network.

The egress bandwidth profile can consist of the same parameters and switches as an ingress bandwidth profile, but instead of being defined per priority can be defined per egress equivalence class (EEC).

Regarding the Gateway(s) 208, implementations may include configuring one or more of the Gateway(s) 208 to provide operations similar to a Terminal 202, in addition to operability as a larger aggregation point. Accordingly, in an implementation, Gateway(s) 208 can be provided with preference to, or a more consistent uplink bandwidth allocation than provided to Terminals 202. In an implementation, the Gateway(s) 208 can be configured with capability to operate in multiple modes, for example, a Terminal-mode and an Aggregation mode. In an implementation, Terminal mode can include the Gateway(s) 208 performing, or being capable to perform the same functions as described for a Terminal 202, at least as far as bandwidth allocation is performed. In an implementation, associated with the Aggregation mode, the Gateway(s) 208 can be allocated a dedicated, reserved, or higher priority uplink capacity, so that they need not request and be assigned changing uplink allocations over time. However, in an implementation, the Gateway 208(s) can be configured such that, in Aggregation mode, it can still send an allocation request with demands to the Resource Manager 210 per destination. Also, the Gateway 208(s) can be configured such that, while in Aggregation mode, it can still receive a per-downlink destination guidance. Reception of the per-downlink destination bandwidth guide can allow the Resource Manager 210 to receive demands per destination in order to better estimate path congestion states, as well as to throttle traffic to some destinations if it is determined that they would likely hit congestion after having utilized satellite resources across multiple hops. In an implementation, the LEO network system 200 can be configured with capability to broadcast or otherwise provide minimum per destination limits to Terminals 202 and/or Gateway(s) 208, that can be used any time and only require negotiation of increased per destination limits when a Terminal 202 or Gateway(s) 208 determines that its demand exceeds that minimum. This capability may provide, for example, reduction in the need for a Terminal 202 or Gateway(s) 208 to await information on destination limits.

Regarding features and capabilities of the Resource Manager 210, it will be understood that in an example operation, at any moment in time, a Terminal 202 may have traffic arriving that: i) is a mix of priorities; ii) has a certain total demand that may or may not be in excess of its CIR; and iii) has one or many destinations. Regarding the mix of priorities and certain total demand that may or may not be in excess of its CIR, the following are possible, without taking into account the destination(s) of such traffic: i) total offered traffic at ingress being less than CIR, taking into account committed burst size (CBS); ii) total offered traffic at ingress being greater than CIR, taking into account CBS, but less than the EIR taking into account excess burst size (EBS); and iii) total offered traffic at ingress being greater than EIR taking into account EBS.

As will be understood by persons of ordinary skill upon reading this disclosure, the Resource Manager 210 in combination with the Terminals 202 and Gateway(s) 208, can assign uplink bandwidth to handle carrying this traffic and, at the same time, lower non-productive consumption of resources by reducing the instances of transferring or admitting traffic that, due to limited capacity of the network, has a high probability of being dropped.

Among the means for meeting this challenge that are provided by implementations according to this disclosure include taking traffic destination into account in deciding whether to admit or not admit. Such means are capable of handling, for example, four scenarios. Scenario one is traffic being within ingress CIR but, due to current congestion or other end-to-end path limit unrelated to egress CIR, the traffic would get dropped. It will be understood that, preferably, the frequency of this occurring should be low, or minimized. However, since it can occur, it is preferably accounted for. Scenario two is traffic being within ingress CIR, but due to egress CIR, the traffic would get dropped. Scenario three is traffic being greater than the ingress CIR, but within the EIR, but due to current congestion or other end-to-end path limit unrelated to egress EIR, the traffic would get dropped. Scenario four is the traffic being greater than the ingress CIR, but within the EIR, but due egress EIR, the traffic would get dropped.

In view of the scenarios described above, the following examples are among the considerations: ingress CIR per priority; total current demand per priority; total current demand per priority per destination; and egress CIR per EEC. Regarding ingress CIR per priority, more than CIR per priority can be considered. Examples include, but are not limited to, site level CIR, per Virtual Circuit CIR. Regarding total current demand per priority, demand can be, for example, a snapshot amount of data, an averaged throughput, or a predictive value based on historical information. Also, total current demand per priority may be less than or greater than CIR, and may be less than EIR. Accordingly, in aspect, sub-CIR traffic (compliant) can be reported separately of EIR traffic above CIR (non-compliant). Regarding total current demand per priority per destination, it will be understood that "destination" is not necessarily limited to being a single end device, and, instead or in addition can be an aggregate of all demands to a given beam or region.

The example considerations identified above are not an exclusive list. For example, additional considerations can include CIR/EIR per EVC instead of just per priority at ingress; CIR/EIR per EVC instead of just per EEC at egress; same per OVC for Gateway sites; and Overall Virtual Network Operator (VNO) aggregate CIR limits. The overall VNO aggregate CIR limits can be policed system wide across all the sites owned by the VNO, which may be more limiting than the sum of all CIRs of the individual sites.

Example implementations of the Resource Manager 210, with respect to its functionality of allocating bandwidth will now be described. In an example implementation, a process for allocating bandwidth can include determining whether paths are congestion constrained; determining predicted overflows at a given egress, for each Gateway 208 using Aggregate mode, determining any per destination limits for congested paths; and then for each terminal and Gateway 208 using Terminal mode from within the remaining aggregate path bandwidth (after accounting for Gateway Aggregate mode bandwidth), performing a bandwidth allocating process, which will be described in greater detail in paragraphs that follow. Regarding determining whether paths are congested, in an aspect, operations can include determining whether all demand per destination across all terminals can be allocated. In an implementation, this determination can include the following operations: i) trying for all flows across all priorities including excess; and ii) trying for all committed flows. Regarding determining predicted overflows at a given egress, the bandwidth allocating process can include backing off of flows that would overwhelm a given egress and resubmitting excess bandwidth for allocation to other flows.

In an implementation, an example of the bandwidth allocating process identified above, for Terminals 202 and Gateway(s) 208 using a Terminal mode, (after accounting for Gateway Aggregate mode bandwidth), can include the following, each of which can be implemented as an operation, groups of operations, sub-process, module, or any equivalent thereto:

for congested paths, determine per destination limits;
    allocate excess bandwidth;
    allocate uplink bandwidth;
    respond, as required, with new Bandwidth Allocations; and
    handle inter-terminal fairness when there are congested paths.

Regarding allocation of excess bandwidth, implementations can include using the routing information, and determining based on previous time tick (T-1) congestion and any new demands whether to apply limits to any destinations for a given source. The determining can take into account available routes, remaining room (e.g., before causing congestion), and unmet demands that are present, whereupon a portion (or all) of the excess can be assigned to one or more allocations.

Also regarding the allocation of excess bandwidth, implementations can include, if excess bandwidth is available and not allocated, applying another pass that first provides an amount of that bandwidth to terminals whose current allocation is less than their CIR, and then to terminals whose current allocation is less than their EIR. In an aspect, the Resource Manager 210 may be configured to be capable of weighing path/destination congestion considerations and, based on same, skewing how this excess bandwidth is allocated.

Regarding allocation of uplink bandwidth, in an implementation the Resource Manager 210 can be configured to be capable of: stopping the assigning of any bandwidth for a terminal; decreasing the amount of bandwidth being allocated to the terminal in aggregate; maintaining the amount of bandwidth being allocated to the terminal in aggregate; and increasing the amount of bandwidth being allocated to the terminal in aggregate.

Regarding the handling of inter-terminal fairness when there are congested paths, include: in an implementation the Resource Manager 210 can be configured to apply operations that can include (I) through (V) listed below:
I. Providing each terminal with a minimum allocation that is a function of its CIRs even when no demand is present;
II. Optionally add factors to skew proportion of bandwidth provided to a terminal as a function of other factors such as relative link conditions between the terminals;
III. Within each priority:
  provide all bandwidth to committed flows where possible;
  provide all bandwidth for excess flows where possible;
  when not possible to meet all flows, proportionally give less to excess flows;
  when not possible to meet all committed flows, proportionally give less between terminals. Both absolute priority and weighted priority rules between terminals may be used.
IV. Across priorities
  provide all bandwidth to committed flows whenever possible;
  when not possible to meet all flows, give less to excess flows at lower priority first (can be absolute or weighted); and
  when not possible to meet all committed flows, give less to committed flows at lower priority first (can be absolute or weighted).
V. Within a VNO
  apply VNO-level limits to restrict an aggregate CIR if the sum of the VNO owned devices exceed the VNO limit.

Regarding information included in transmissions of data by terminals 202, some information may be passed with each message due to its dynamic nature, and some of the information may be passed or can be known to the Resource Manager 210 due to its more static nature (E.g., CIR). However, even in systems where it is possible for a ground network to dynamically negotiate new CIR and EIR capabilities with the Terminal 202 or Gateway(s) 208, this information could be passed real-time to the Resource Manager 210 and taken into account when assigning and planning bandwidth usage.

In an implementation, new bandwidth allocations can be made constantly every time tick. In addition, the Resource Manager 210 can be configured with capability to provide an allocation that is valid unless revoked for many time ticks. A time tick is a generic term meant to indicate the shortest period at which Terminals 202, Gateways 208 and the Resource Manager 210 communicate. In an aspect, it can be preferable that the time tick be significantly smaller than the amount of time that a given Terminal 202 or Gateway 209 is sending to and receiving from a LEO satellite node 206 that is in its line of sight.

In an implementation, the Resource Manager 210 can be configured to include a routing function, and may interact with the Bandwidth/Congestion allocation function of the Resource Manager 210 in order to adjust the routes taken for certain traffic priorities based on path congestion. The interaction can include: i) Given sustained congestion in path A, change the routing table for lower priority traffic (e.g., Medium, Low) to uncongested path B in order to offload congestion if path B can handle the additional traffic; and ii) Given unsustained congestion in path A and where latency considerations matter for a given priority (e.g., Medium), move back from path A to path B if path A can handle the additional traffic.

In an implementation, the Resource Manager 210 can include a Satellite to Ground Mapping function. The Satellite to Ground Mapping function can be responsible for determining which LEO satellite node(s) 206 service which Terminal 202 and Gateway 208 beams with what frequencies. In an aspect, the Satellite to Ground Mapping function can be configured to provide information to the Bandwidth Manager that states, for time T, which LEO satellite node(s) 206 and frequencies are available to service a given location on the ground in which a Terminal 202 resides. Implementations of the Satellite to Ground Mapping function can be provided with information including, but necessarily limited to, local blockages, frequency restrictions, and other limits to which locations can be serviced by which satellites, and can be configured to utilize such information in the mapping function. In an implementation, the Bandwidth Manager function of the Resource Manager 210 can be configured to provide information to the Satellite to Ground Mapping function regarding, for example, utilization and congestion, and the Satellite to Ground Mapping function can be configured accordingly to use this information in its mapping operations.

Regarding Terminals 202, each can be configured to apply a plurality of ingress shaping rules such as, but not limited to: receiving a schedule for time and frequencies on which it can uplink scheduled packets that were admitted, based on priority and destination; and providing a demand profile to the Bandwidth Manager 210. Also, in an implementation, the Terminals 202 can include a capability to apply real-time decisions, based for example on a predetermined policy, to allow (or not) packets from one queue set to be used in an allocation scheduled for another queue set. Configured as such the Terminals 202 can, for example, schedule packets that are high priority and conformant that arrive after an allocation, and can utilize a queue that may otherwise go empty by servicing a different queue than was originally scheduled.

Figure 3:
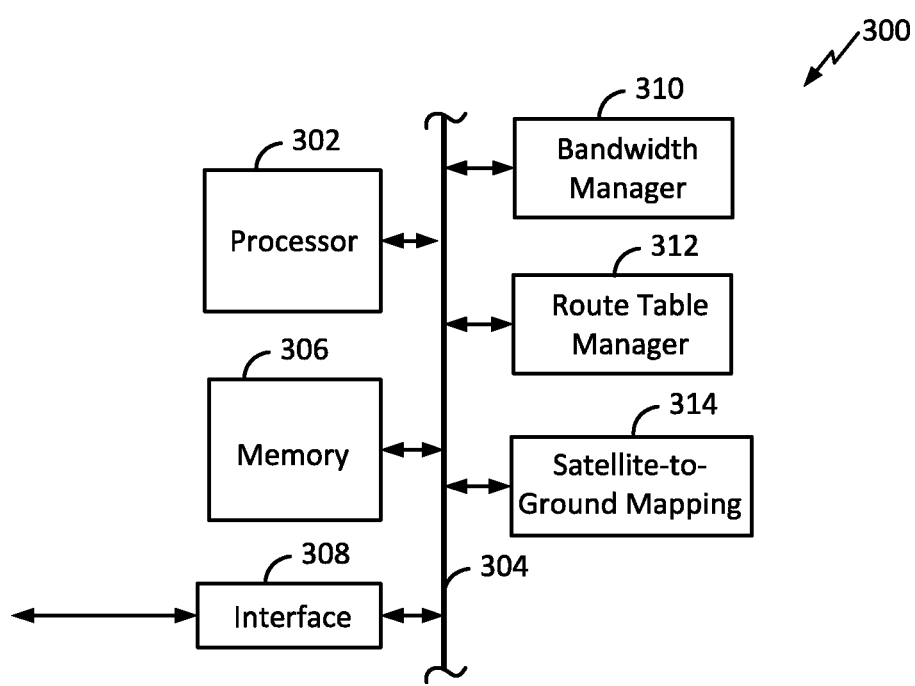
FIG. 3 illustrates a logical block diagram of an example resource manager sub-system, for exemplary LEO satellite implementations of a moving topology, multiple node network system according to various implementations.

FIG. 3 illustrates a functional block diagram of one example implementation 300 of a Resource Manager, such as the FIG. 1 Resource Manager 110, or the FIG. 2 Resource Manager 210, or both, for practices according to disclosed aspects. Description of example features and aspects of the implementation 300 will refer to a "Resource Manager apparatus 300." It will be understood, though, that neither the term "Resource Manager apparatus 300" nor FIG. 3 place or imply any limits regarding the scope or range of hardware configurations, hardware architectures, and technology(ies) that can be applied in implementations of the FIG. 1 Resource Manager 110, or the FIG. 2 Resource Manager 210, or equivalent devices in practices according to disclosed aspects. It will also be understood that neither of the graphical blocks representing its exemplary functions are necessarily specific units or devices. For example, FIG. 3 can be implemented by, in whole or in part, by distributed resources, including "cloud" resources in communication with the Terminals 202 and Gateway(s) 208, for example, through the Internet, and can be implemented by resources distributed, at least in part, among the Terminals 202.

Referring to FIG. 3, the implementation 300 can include a processing resource, such as represented by processor 302, having access to a memory resource, for example as represented by the processor 302 block having access, via a bus 304, to a memory 306. An external interface 308 can couple to the bus 304. The implementation 300 can include a Bandwidth Manager 310, a Route Table Manager 312, and a Satellite-to-Ground Mapping block 314, each of which is represented a module block coupled to the bus 304. Each of the Bandwidth Manager 310, Route Table Manager 312, and Satellite-to-Ground Mapping block 314 can comprise executable instructions stored in the memory 306 that, when read and executed by the processor 302 cause the processor 302 to perform particular operations and functions corresponding to those described herein. Physical techniques for implementing the processor 302, bus 304, memory 306 and interface 308 can utilize conventional techniques for network controllers of a network comprising a constellation of satellites, through which ground terminals can transmit messages and receive messages. Therefore, further detailed description is omitted.

FIG. 4 illustrates a functional block diagram of one example implementation 400 of one or more of the FIG. 1 Terminals 102, or the FIG. 2 Terminals 202, or both. The implementation will be referred to as a "bandwidth-profile managed terminal 400." Description of example features and aspects will refer to a "Terminal apparatus 400." It will be understood, however, that neither the term "Terminal apparatus 400" nor FIG. 4 place or imply any limits as to the range or scope of hardware configurations, hardware architectures, and technology(ies) that can be applied in implementations of Terminals 102, or the FIG. 2 Terminals 202, or equivalent devices in practices according to disclosed aspects.

Before describing specific blocks in FIG. 4, certain example features and aspects of the bandwidth-profile managed terminal 400 will be described. For example, in one or more implementations, the bandwidth-profile managed terminal 400 can be configured to receive demands from consumers or other users, and send these to the Resource Controller 110 or Resource Manager 210, and to receive allocations in reply and, based on these, to update a bandwidth profile. In an aspect, the bandwidth profile of each terminal can include an ingress bandwidth profile and an egress bandwidth profile. In an implementation, the bandwidth-profile managed terminal 400 can be capable of performing various bandwidth management processes based, at least in part, on the currently updated bandwidth profile. Such processes can include, for example, applying ingress shaping rules that can be based at least in part on the current ingress bandwidth profile. Example operations in the application of such rules can include one or more of marking packets in excess of a CIR, dropping packets in excess of an EIR, or enqueuing admitted packets, and each of these can be based, for example, on priority, or destination, or both.

Example operations in the bandwidth management processes applied the bandwidth profile managed terminal 400 can also include, for example, scheduling packets based on priority, destination, or both, within a received transmission schedule, as well as dequeuing and transmitting packets. In an implementation, the bandwidth profile managed terminal 400 can be configured to respond to scenarios such as, for example, queues and number of packets per queue that were scheduled not being the exact queues, and the number of packets that are actually enqueued at dequeuing time. Example causes of such a scenario may include, but are not limited to, real-time arrivals of higher priority traffic. In an implementation, the bandwidth profile managed terminal 400 can be configured to drop aged packets. Also, in an implementation, the bandwidth profile managed terminal 400 can apply operations of dropping packets after being enqueued and already admitted for ingress CIR/EIR purposes, when system push-back happened for reasons such as path congestion or egress congestion. Such dropping after admission of packets that, for new reasons, are likely to be dropped can prevent such packets from utilizing constellation resources. In addition, the bandwidth profile managed terminal 400 can be configured to receive, for example from the Resource Manager 210, a schedule for time and frequencies on which it can uplink queued traffic. In a further implementation, the bandwidth profile managed terminal 400 can be configured to indicate congestion being present. For example, one such configuration can include adaptation and use of existing defined mechanisms such as setting Explicit Congestion Notification bits for IP payloads, to indicate that congestion is present.

In an implementation, the bandwidth profile managed terminal 400 can be configured to send, in response to receiving customer demands, a demand profile, for example to the FIG. 1 Resource Manager 110 or FIG. 2 Resource Manager 210. Referring to FIG. 4, implementations of the Resource Manager 210 can include a Bandwidth Manager unit or module. In an aspect, in association with such implementations, demand profiles received at the Resource Manager 210 may be directed to the Bandwidth Manager. In another implementation, the bandwidth profile managed terminal 400 can be configured to participate in dynamic protocols as they are defined in the industry, such as new protocols to negotiate new bandwidth profiles and auto-provision them.

Implementations of bandwidth profile managed Terminals 400 can "sort" or align traffic to be sent, using for example virtually queuing, separately in relation to different beams having different bandwidth allocated for the same priority. The virtual queuing can enable, for example, determining demand independently for each destination, and avoiding head-of-line blocking to packets to a destination with more available bandwidth by packets to a destination with less available bandwidth.

In an implementation, the bandwidth profile managed terminal 400 can be configured to respond, upon receiving a bandwidth allocation, with operations that can include: using rules (e.g., weighted queuing) to dequeue per priority;

using the per destination amounts in the allocation as a guide; and determining based on certain rules whether to fill-in or preempt scheduled transmissions for other queues as a function of the real-time queue state at the just-in-time moment before packet uplink transmission. In an implementation, the bandwidth profile managed terminal 400 may be further configured so that, if it has excess assignment on the uplink that would go unutilized, it may, subject to certain rules, use that excess to send traffic to a destination. The FIG. 4 example implementation of the bandwidth profile managed terminal 400 can include an ingress classification block 404 that can be communicatively coupled to a VLAN capable Ethernet 402 and configured to receive data from 402 and can feed classification results to token bucket priority ingress handling block 406. The token bucket priority ingress handling logic block 406 can be communicatively coupled to noncompliant drop block 408, to multicast/broadcast replication logic block 410, and to uplink segmentation, priority queuing block 412. The priority queuing block 412 can be communicatively coupled to bandwidth determination and control block 414, to address resolution block 416, and to uplink transmission, modulating, encoding block 418. The modulating, encoding block 418 can be communicatively coupled to satellite interface 420. A downlink transmission, demodulation, decoding block 422 can receive input from the satellite interface 420, and feed decoded output to downlink and reassembly block 424. The downlink and reassembly block 424 can be communicatively coupled to QoS monitoring and testing block 426 and to egress token, bucket handling, and EEC handling block 428. The QoS monitoring and testing block 426 can be communicatively coupled to the uplink segmentation, priority queuing block 412. The egress token, bucket handling, and EEC handling block 428 can be communicatively coupled to the VLAN capable Ethernet 402 and to the noncompliant drop block 408.

FIG. 5 illustrates one logical flow 500 of example operations that can be applied by the FIG. 1 Terminals 102, or by the FIG. 2 Terminals 202, or both, in bandwidth profile managed operations and processes, in methods according to this disclosure. Description will reference the FIG. 2 Terminals 202 and FIG. 4. This is not intended, though, and should not be understood as implying any limitation, or any preference as to any particular multiple node network on which operations 500 may be performed.

Referring to FIG. 5, operations 500 can start at 502 by a Terminal 202 receiving, e.g., from the FIG. 4 VLAN capable Ethernet 402, a packet. Upon the Terminal 202 receiving the packet at 502, operations at 504, e.g., by operations at the FIG. 4 ingress classification block 404, can perform ingress classification. Upon ingress classification at 504, the Terminal 202 can at 506 apply to that classification its current ingress traffic profile, e.g., by operation at the FIG. 4 token bucket priority ingress handling block 406, and as represented by decision block 508 can drop the packet at 510, e.g., by operation at the noncompliant drop block 408, if it is not in profile. If the packet is determined to be in profile then, as represented by the "Yes" arrow from decision block 508, the Terminal 202 may at 512 determine the destination of the packet, e.g., by operation at the address resolution block 416. In an implementation, as represented by arrow 514 from block 506 to block 512, the Terminal 202 may be configured with capability (for example, rules or trigger conditions) to bypass applying the ingress traffic profile and, instead, pass the packet directly to 512.

Referring to FIG. 5, upon determining the destination of the packet at 512 the Terminal 202 may enqueue the packet, at 516 in a per-priority queue, e.g., priority queuing function of block 412, according to its COS or another indicator of priority. Associated with the enqueuing, for example based on a resulting fill state of the queue, the Terminal 202 may determine whether an update in its bandwidth allocation is required. Assuming no update is required, then, as shown by the "No" exit from decision block 518, the Terminal 202 can at 520 schedule, e.g., by operation at FIG. 4 block 412, the packet for an upcoming transmission, e.g., by operation at the uplink transmission, modulating, and encoding block 416. As shown by the "Yes" exit from decision block 518, if the Terminal 202 determines a bandwidth allocation update is required it can at 522 apply operations to evaluate its state and send a bandwidth request, e.g., by operation at the FIG. 4 bandwidth determination and control block 414, based on the evaluation. Referring to FIG. 2, the Terminal may send the bandwidth request through the EI LEO network 204 and to the Gateway 208 for forwarding to the Resource Manager 210. Alternatively, the Terminal 202 may send the bandwidth request by alternative means. The Terminal 202 may be configured to either proceed directly to 520 to schedule the packet or wait for reception of that allocation at 524. As represented by block 526, while performing the above-described operations the Terminal 202 may be performing, for example as a background process, an evaluating of aging and monitoring of flow. Also while performing other described operations, the Terminal 202, as shown by block 528, can perform ongoing dequeuing of packets into scheduled time/frequency slots.

Figure 6:
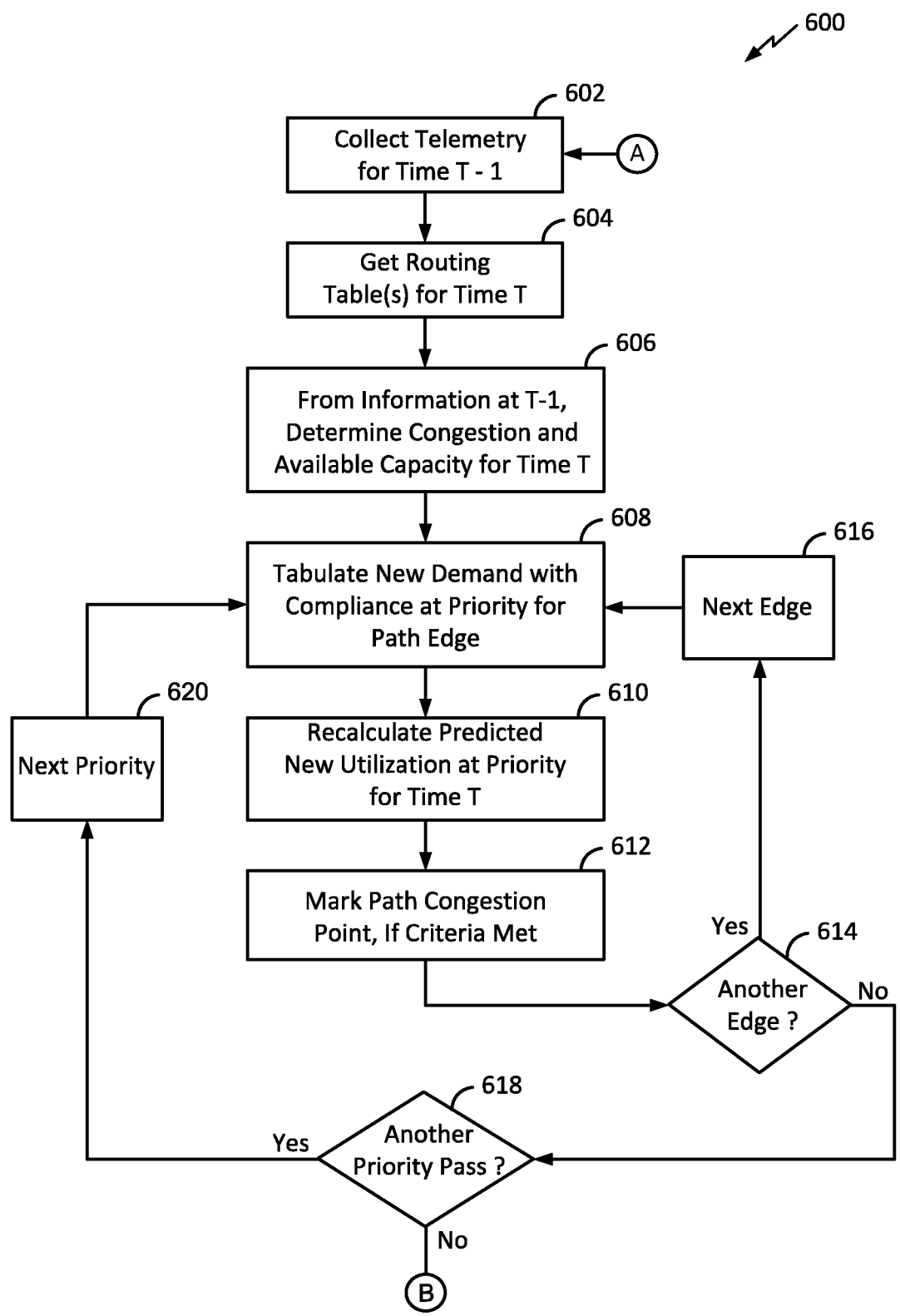
FIG. 6 illustrates a logical flow diagram of example operations associated with one or more processes in bandwidth management according to various implementations.

FIG. 6 illustrates a logical flow diagram of example operations 600 in one or more processes of determination of network state for a snapshot time T, in bandwidth management according to various implementations. Description will reference the FIG. 2 EI LEO network 204. This is not intended, though, and should not be understood as implying any limitation, or any preference as to any particular multiple node network on which operations 600 may be performed.

Referring to FIG. 6, operations 600 can start at 602 by operations, for example, of collecting telemetry (traffic flow) from, for example, the mobile network nodes 206. One example can be the FIG. 2 Resource Manager 210 receiving telemetry data relating to a state, or a parameter in the state, of the EI LEO network 204. In an implementation, this information can be considered indicative of the state of the network at time T−1. Description proceeding to block 604, operations in the flow 600 can include retrieving at 604, or otherwise utilizing route tables such as currently applied in the network nodes 206. In an aspect, block 604 can represent subsequent blocks utilizing such information. Proceeding to block 606, in an implementation, operations in the flow 600 can include, at 606, operations in determining congestion, and available capacity for time T. In an aspect, the Resource Manager, e.g., the FIG. 2 Resource Manager 210, can be configured to determine the congestion and available capacity as a function of both the traffic flows, such as reported via telemetry at 602, and traffic admitted at time T−1. In an implementation, the Resource Manager e.g., FIG. 2 Resource Manager 210 can be configured to include, in the operations at 606, a determining of uplink and downlink available capacity in view of actual usage or the telemetry collected at 602.

Referring to FIG. 6, one example logic relation of blocks 608, 610, 612, 614, 616, 618 and 620 will be described. For convenience, these operations will be referenced collectively as "priority compliance" blocks 608-620. It will be understood that the word string "priority compliance blocks 608-620" is used herein only as a convenient collective reference, and has no descriptive or limitative meaning. The example logical relation and functions of priority compliance blocks 608-620 will be described assuming priority-awareness is a desired goal in an application, and that ingress bandwidth profile or ingress-egress profile based bandwidth allocation is sought for a multiple node, time varying topology network. The description also assumes the resource manager, e.g., the FIG. 2 Resource Manager 210, has information identifying all edge nodes extant at time T-1.

An operation can start at 608 upon a new demand being received, for example, by the FIG. 2 Resource Manager 210 from, or originating from one of the Terminals 202. The priority compliance blocks 608-620 can then operate to estimate whether current commitments will be met, at all edge nodes, if the demand is allocated to the requesting Terminal, without adjusting existing allocations. The estimation outcome being that all current commitments will be met, at all edge nodes, without adjusting existing allocations can be termed meeting a criterion for allocation. The determining can include first performing, for each priority level employed, a loop comprising blocks 610, 612, 614 and 616 for every edge node. For convenience this loop will be referred to as "loop 610-616." The block 614 termination condition for loop 610-616 is met when the loop finishes operation on the last of the current edge nodes. After that termination, if there is another level of priority, loop 610-616 is repeated, but within a larger loop that includes blocks 618 and 620, with 618 being a termination condition. Block 618 terminates the large loop when edge compliance has been estimated at all edge nodes, for all priority levels.

Example aspects of loop 610-616, and of the larger loop that includes blocks 618 and 620 will now be described in greater detail. Referring to FIG. 6, a start event for loop 610-616 can be, as described above, a receipt at 608 of a new demand. The demand may be received, for example, by the FIG. 2 Resource Manager 210, from or originating from one of the Terminals 202. In response, at 608 or 610 operations can perform a test addition of bandwidth meeting the demand to the requesting Terminal and then, at 610, operations can be applied that, referring to FIG. 2, re-determine, for an extant edge node among the Terminal Nodes 202, a utilization of each LEO satellite Node 206, each ISL 214 and each uplink/downlink 214. Operations applied at 612 can then "mark"—meaning identify for future retrieval or for other processing—path congestion point(s). Unless termination block 614 determines the marking or other identification of path congestion points applied at block 612 was for the last of the edge nodes, a next edge node is selected at block 616 and the above-described application of blocks 610-616 is repeated. Example operations 600 can perform the larger loop described above, selecting at 620 in each repeat a next priority level, until termination block 618 determines the larger loop has been completed for each of the priority levels.

Upon termination block 618 determining the larger loop (i.e., blocks 608, 618, and 620 and loop 610-616) has been completed for each of the priority levels, operations in a process for adjusting allocations at the Terminals 202 can be applied in a manner according to disclosed aspects, which can provide allocation to the requesting Terminal of a bandwidth/priority meeting the demand, without terminating or unacceptably slipping in meeting existing commitments.

Figure 7:
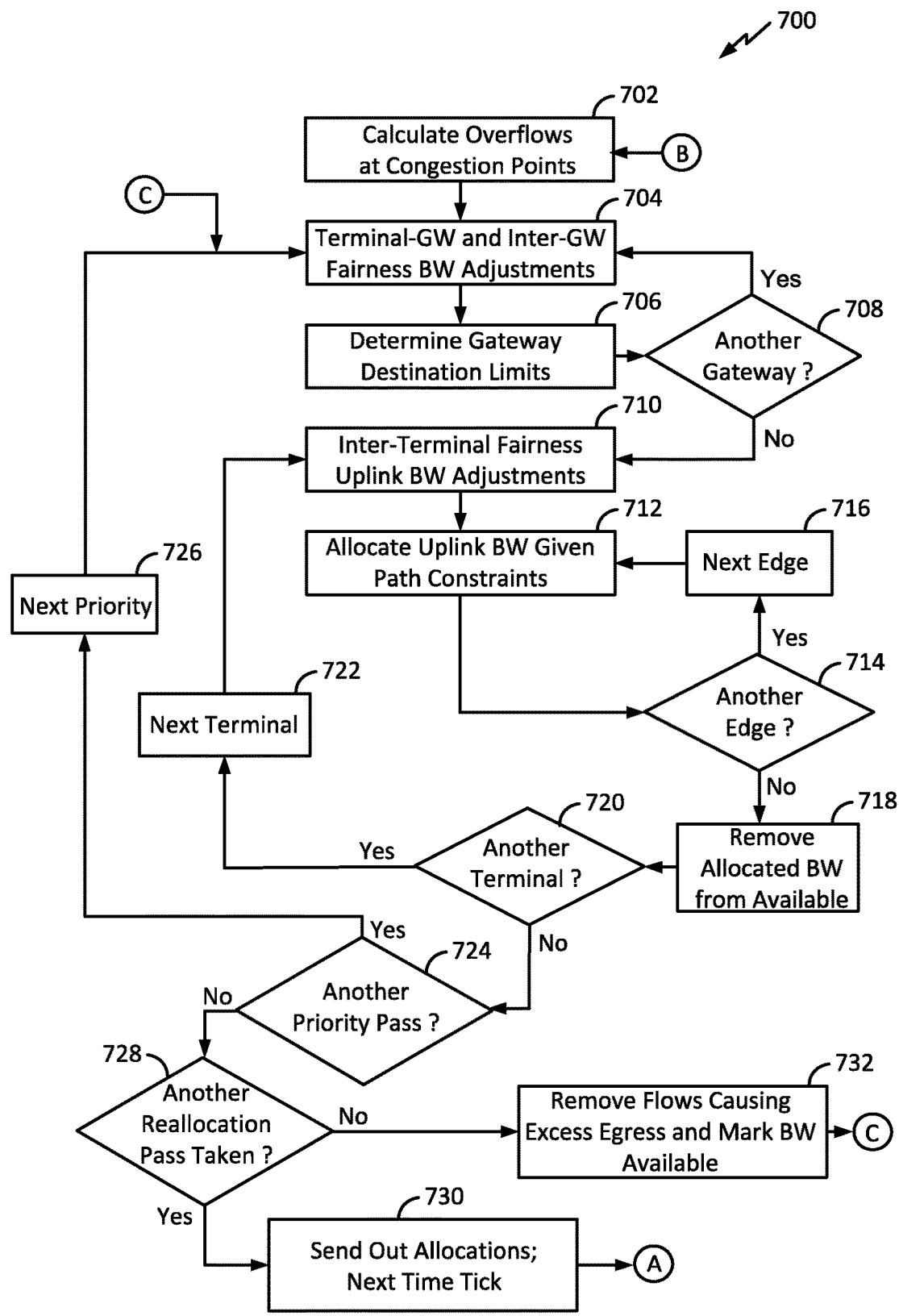
FIG. 7 illustrates a logical flow diagram of example operations associated with one or more processes methods of bandwidth and per destination allocations, by a resource manager, according to various implementations.

FIG. 7 illustrates exemplary operations 700 in a process of such adjusting allocations to the Terminals 202. Instances of the flow 700 can be associated, for example, with "ticks" of a system clock. Looking at FIG. 7, in the context of the present application, it can be seen by a person of skill in the art, for example, from blocks 720, 722, and 724, that associated with a new instance of the flow 700, a priority level index (not visible in FIG. 7) or equivalent therefore may be initialized to a start value. It will also be assumed that an index for terminals, e.g., Terminals 102, can be initialized. It will be understood that implementations do not limit loop control to the example scheme of an incremented index, and that various other schemes can be adapted.

Referring to FIG. 7 operations 700 can start, for example, at 702 by applying operations calculating overflows at congestion points, whereupon description can proceed to 704 where repeated cycles of operations 704 and 706 can be applied, one cycle for each gateway in the network, until the termination condition 708 of fairness adjustment has been applied to all of the network's gateways. Upon meeting termination condition 708, description can proceed to 710, where operations for terminal-gateway fairness and uplink bandwidth adjustments can be applied. Description can then proceed to 712 where, in combination with decision block 714 and next edge incrementing at 716, a logic loop of 712, 714, 716 can be executed for each Terminal 102 connected to the edge node, and thereby allocating uplink bandwidth to each, subject to path constraints.

Referring to FIG. 7, upon meeting the loop termination condition 714, description can proceed to 718, where operations can remove, from the available bandwidth, the bandwidth allocated during the above-described visiting of each edge node. Upon such removal, description can proceed to 720, where, if there is at least one terminal that has not yet been visited by the above described loops of 712, 714, and 716, the conditional branch 720 causes at 722 an incrementing, or equivalent, of the "Next Terminal" index and a repeat of the loops 712, 714, and 716.

Upon meeting the condition branch 720 branch condition, i.e., after visiting all of the terminals once—allocating and adjusting bandwidth at the initial priority level—the branch 720 steers the flow to the conditional branch 724. Since, in this example, the first cycling through the terminals was at the initial priority level, the conditional branch 724 termination condition is not met. The branch 724 therefore causes an incrementing, at 726, to the next priority level, and a repeat of the process described above, starting at 707, this time performing allocation and adjustments of bandwidth at the next priority level.

After executing the 710, 712, 718, 720 loop for the last terminal, at the last (in terms of indexing by 724) priority level, the conditional branch 724 steers the flow to the conditional branch 728 level loop that starts at 704 for the last priority level, the conditional branch 724 steers the flow 700 to the exit selection branch 728. The selection branch 728 then selects, based on the outcome of its inquiry of "another reallocation pass taken?", between 730 and 732 as the exiting operation. The exiting operation at 730 is a sending out of allocations, at the next time tick. The exiting operation at 732 includes removing flows causing excess egress and, marking the bandwidth released through the removal as available.

One illustrative example of bandwidth profile based control according to various aspects will now be described. The example will be described in reference to Tables 1-17.

The example assumes, as a scenario, four mobile network nodes, such as the FIG. 1 Nodes 106, and ISL connections between some of the mobile Nodes 106. As described earlier, Nodes 106 may be LEO satellites. Operations will assume a snapshot where there is an uplink from ground (i.e., Terminal 102A) to mobile Node 106A (also labeled as "S1"), S1-S2 is the ISL from Node 106B to Node 106C (e.g., Satellite 1 to Satellite 2) and S4-D is the downlink from Node 106D (Satellite 4) to the ground.

At time 0, as shown by Table 1 below, the system has no already committed traffic on any downlink but has committed traffic on ISLs (presumably from satellites outside of this example connected to S1 through S4) that were allocated before this example begins. This is known by the RM as received from the network due to actual utilization received from the constellation.

TABLE 1

Initial Utilization of CIR Already In Use

| | Up | S1 | S2 | S3 | S4 | Down |
|---|---|---|---|---|---|---|
| Up | x | 0 | 0 | 0 | 0 | x |
| S1 | x | x | 25 | 25 | 25 | 0 |
| S2 | x | 25 | x | 25 | 25 | 0 |
| S3 | x | 25 | 25 | x | 25 | 0 |
| S4 | x | 25 | 25 | 25 | x | 0 |
| Down | x | x | x | x | x | x |

At time 0, the system has an ISL and Uplink/Downlink capacity estimated by information received by the RM from the network of the available capacity of each link. Table 2 below is an assumed hypothetical, of an estimated ISL and Uplink/Downlink capacity.

TABLE 2

Capacity

| | Up | S1 | S2 | S3 | S4 | Down |
|---|---|---|---|---|---|---|
| Up | x | 60 | 60 | 10 | 0 | x |
| S1 | x | x | 100 | 100 | 100 | 60 |
| S2 | x | 100 | x | 100 | 100 | 60 |
| S3 | x | 100 | 100 | x | 100 | 60 |
| S4 | x | 100 | 100 | 100 | x | 60 |
| Down | x | x | x | x | x | x |

Table 3 is the current route table, which is known to the RRM.

TABLE 3

| Routes | | | | |
|---|---|---|---|---|
| A -> B | Up-S1 | S1-S2 | S2-S3 | |
| A -> C | Up-S1 | S1-S2 | S2-S3 | S3-S4 |
| B -> C | Up-S3 | S3-S4 | | |

Table 4 is an assumed current subscription for the terminals involved in the example (subscribed CIR/EIR) is provided in tab Bandwidth Profiles.

TABLE 4

| Terminal | Priority | TermPri | CIR | EIR |
|---|---|---|---|---|
| A | H | A-H | 10 | 60 |
| A | M | A-M | 20 | 60 |
| A | L | A-L | 40 | 60 |
| B | H | B-H | 25 | 60 |
| B | M | B-M | 10 | 60 |
| B | L | B-L | 20 | 60 |
| C | H | C-H | 10 | 60 |
| C | M | C-M | 20 | 60 |
| C | L | C-L | 30 | 60 |

For the purposes of this example egress bandwidth profiles are ignored and assumed not to be the bottleneck. One configured parameter can be a weight per priority, an arbitrary example set of values is shown in Table 5 below:

TABLE 5

| Weights Per Priority | |
|---|---|
| H | 50 |
| M | 30 |

Weight per priority was not used in this particular example. The example values are provided to show how M/L could be handled. In an implementation, such weights can be manipulated, to provide absolute or weighted priority. It will be understood that using weight per priority may, depending in part on implementation, necessitate additional algorithmic passes to allocate unused bandwidth from one priority back into other priorities.

Another configured parameter that can be used is weight per terminal, such as the example values presented in Table 6 below.

TABLE 6

| Weight per Terminal | |
|---|---|
| A | 20 |
| B | 10 |
| C | 10 |

To illustrate an operation of this aspect, weight per terminal was used in this particular example. It will be understood that complete fairness would be equal weights. In an implementation, modified weights can be used when there is not, or may not be enough bandwidth to meet all demands, as it provides another control dimension or option, namely, allowing some terminals to be treated with higher priority relative to other terminals.

Table 7 shows one example demand profile received from terminals A and B.

TABLE 7

| | Up | S1 | S2 | S3 | S4 | Down |
|---|---|---|---|---|---|---|
| Up | x | 200 | 0 | 100 | 0 | x |
| S1 | x | x | 200 | 0 | 0 | 0 |
| S2 | x | 0 | x | 200 | 0 | 0 |
| S3 | x | 0 | 0 | x | 200 | 100 |
| S4 | x | 0 | 0 | 0 | x | 200 |
| Down | x | x | x | x | x | x |

It will be understood that flow control according to disclosed aspects can moderate demand if the demand is far in excess of the available capacity in steady state. Such events or scenarios can be referred to, for example, as bandwidth-constrained cases. To illustrate such operation, the example shows a very high demand relative to available capacity. The operation can include intermediate steps, and these are presented. It will be understood that one or more implementations may omit one or more these intermediate steps. However, they are explicitly presented for this example to provide further helpful perspective on operations. One hypothetical example of such an allocation process, and a corresponding analytical result of such a process, is presented in FIG. 8, described in greater detail in a later section.

To avoid complexities not particular to the disclosed aspects, the example assumes one terminal per cell, which can obviate need to describe resolution of a specific destination.

Regarding the example allocation generated in this example in response to the example demand, when considered by the Bandwidth Manager in view of the present attendance in view of the example state of the network, for purposes of focusing on concepts and aspects of same, the assumed allocation is in terms of an amount of data for a future transmission, instead of specific frequencies and time slots. Therefore, the example responsive assignment does not explicitly reference a specific edge node (e.g., a specific satellite node) or a specific definition of frequency/time slots. Instead example operations and aspects are described in terms of an amount that the terminal can send in aggregate and to each destination, rather than showing the explicit burst time plan that would also need to be passed to the source terminal. However, it will be understood that contemplated implementations can include configuring the resource manager (e.g., the FIG. 1 Resource Manager 110) to include—in granting of bandwidth resources, information specifying a particular satellite, as well as frequencies and time slots to which the terminal is assigned for some future transmission.

Step 1: New Potential Demand State is shown in Table 8 below, and is used to determine how much capacity would be needed to meet the existing committed utilization as well as the new demand. It is solely showing that the demand far exceeds the available capacity.

TABLE 8

New Potential Demand State - New Demand + Old Obligation

| | Up | S1 | S2 | S3 | S4 | Down |
|---|---|---|---|---|---|---|
| Up | x | 200 | 0 | 100 | 0 | x |
| S1 | x | x | 225 | 25 | 25 | 0 |
| S2 | x | 25 | x | 225 | 25 | 0 |
| S3 | x | 25 | 25 | x | 225 | 100 |
| S4 | x | 25 | 25 | 25 | x | 200 |
| Down | x | x | x | x | x | x |

Step 2: Table 9 below shows an example Capacity Adjusted State shows the capacity after taking into account the existing committed utilization.

TABLE 9

Capacity Adjusted State - Min {Capacity, New Potential State}

| | Up | S1 | S2 | S3 | S4 | Down |
|---|---|---|---|---|---|---|
| Up | x | 60 | 60 | 60 | 60 | x |
| S1 | x | x | 75 | 75 | 75 | 60 |
| S2 | x | 75 | x | 75 | 75 | 60 |
| S3 | x | 75 | 75 | x | 75 | 60 |
| S4 | x | 75 | 75 | 75 | x | 60 |
| Down | x | x | x | x | x | x |

Step 3: New CIR Needs: In an aspect, operations, for example by the FIG. 1 resource manager 110 determines, as shown by example in Table 10 below, how much new CIR demand is needed on each path. As verification, a "CIR Met?" process can be applied to check whether all CIR can be met across all paths. In this example, as shown by the examples results in Table 11 below, CIR is met. If the CIR Met? is not met, additional determinations, for example, similar to those described in greater detail later, for EIR, may be needed to determine the max CIR that can be fit into each path.

TABLE 10

New CIR Needs

| | Up | S1 | S2 | S3 | S4 | Down |
|---|---|---|---|---|---|---|
| Up | x | 10 | 0 | 0 | 0 | x |
| S1 | x | x | 10 | x | 0 | 0 |
| S2 | x | 0 | x | 10 | 0 | 0 |
| S3 | x | 0 | 0 | x | 30 | 5 |
| S4 | x | 0 | 0 | 0 | x | 30 |
| Down | x | x | x | x | x | x |

TABLE 11

CIR Met

| | Up | S1 | S2 | S3 | S4 | Down |
|---|---|---|---|---|---|---|
| Up | x | Yes | Yes | Yes | Yes | x |
| S1 | x | x | Yes | Yes | Yes | Yes |
| S2 | x | Yes | x | Yes | Yes | Yes |
| S3 | x | Yes | Yes | x | Yes | Yes |
| S4 | x | Yes | Yes | Yes | x | Yes |
| Down | x | x | x | x | x | x |

Step 4: As illustrated by Table 12 below, operations for the remaining assignment can include determining the adjusted capacity and the New CIR needs, how much capacity is available on each leg of the paths after meeting the new CIR obligations.

TABLE 12

Remaining Capacity

| | Up | S1 | S2 | S3 | S4 | Down |
|---|---|---|---|---|---|---|
| Up | x | 50 | 60 | 60 | 60 | x |
| S1 | x | x | 65 | 75 | 60 | 60 |
| S2 | x | 75 | x | 65 | 75 | 60 |
| S3 | x | 75 | 75 | x | 45 | 55 |
| S4 | x | 75 | 75 | 75 | x | 30 |
| Down | x | x | x | x | x | x |

Step 5: New EIR Needs: Table 13—of the demand, this determines how much new EIR demand is needed on each path. As a verification or sanity check, a table such as Table 14 "EIR Not Met" can be generated to show where the EIR cannot be met.

TABLE 13

EIR Needs

| | Up | S1 | S2 | S3 | S4 | Down |
|---|---|---|---|---|---|---|
| Up | x | 60 | 0 | 60 | 0 | x |
| S1 | x | x | 60 | 0 | x | 0 |
| S2 | x | x | x | 60 | 0 | 0 |
| S3 | x | 0 | 0 | x | 90 | 30 |
| S4 | x | 0 | 0 | 0 | x | 90 |
| Down | x | x | x | x | x | x |

TABLE 14

EIR Not Met

|      | Up | S1  | S2 | S3 | S4  | Down |
|------|----|-----|----|----|-----|------|
| Up   | x  | Yes | No | No | No  | x    |
| S1   | x  | x   | No | No | x   | No   |
| S2   | x  | x   | x  | No | x   | No   |
| S3   | x  | No  | No | x  | Yes | No   |
| S4   | x  | No  | No | No | x   | Yes  |
| Down | x  | x   | x  | x  | x   | x    |

Step 6: Deficit: as represented by Table 15 below, this determines the difference between the EIR demand and the remaining capacity. Deficit sort, as shown by the example values in Table 16 below, can then determine—based for example on the largest biggest deficit—the order of the bottleneck links.

TABLE 15

Deficit

|      | Up | S1  | S2  | S3  | S4 | Down |
|------|----|-----|-----|-----|----|------|
| Up   | x  | 10  | −60 | 0   | −60| x    |
| S1   | x  | x   | −5  | −75 | x  | −60  |
| S2   | x  | x   | x   | −5  | x  | −60  |
| S3   | x  | −75 | −75 | x   | −45| −35  |
| S4   | x  | −75 | −75 | −75 | x  | 60   |
| Down | x  | x   | x   | x   | x  | x    |

TABLE 16

| Deficit Sort | Deficit | Remaining | Impacts | A | B | New Remainder | Amount for A-B |
|---|---|---|---|---|---|---|---|
| S4-Down | 60 | 30 | A-C, B-C | 20 | 10 | 0 |  |
| S3-S4 | 45 | 45 | A-C, B-C | 20 | 10 | 15 |  |
| Up-S1 | 10 | 50 | A-B, A-C | 20 | 0 | 30 | 30 |

Step 7: Using the bottleneck information and the terminal weights, the demand can be scaled back to fit the capacity of the bottleneck link. Since it is scaled back on the bottleneck link, extra bandwidth can be made available on other links with a smaller bottleneck than be made available for other flows. Each bottleneck link is then visited to limit allocation to within that capacity.

Step 8: From the above, as shown by the example Table 17, actual CIR/EIR allocations to each terminal in total and to each destination can be determined. This would lead to an actual bandwidth (burst plan assignment) to the terminals for the future.

TABLE 17

| Allocations |       | CIR | EIR | Total |
|-------------|-------|-----|-----|-------|
| A           | Total | 10  | 50  | 60    |
|             | B     | 5   | 30  | 35    |
|             | C     | 5   | 20  | 25    |
| B           | Total | 25  | 10  | 35    |
|             | C     | 25  | 10  | 35    |

As will be appreciated by persons of skill upon reading this disclosure, technical elements can include significant reduction or elimination of admission, at network ingress, of traffic having an estimated low probability of reaching its destination, and substantial reduction in the dropping of packets—either during transit through the constellation of Nodes or, after almost reaching the destination being dropped by a destination egress policy shaper, or both. Such persons will also appreciate that disclosed practices can have a non-zero probability of dropped packets, and can thus avoid the unacceptable reduction in network utilization that can accompany total elimination of packet dropping.

Figure 8:
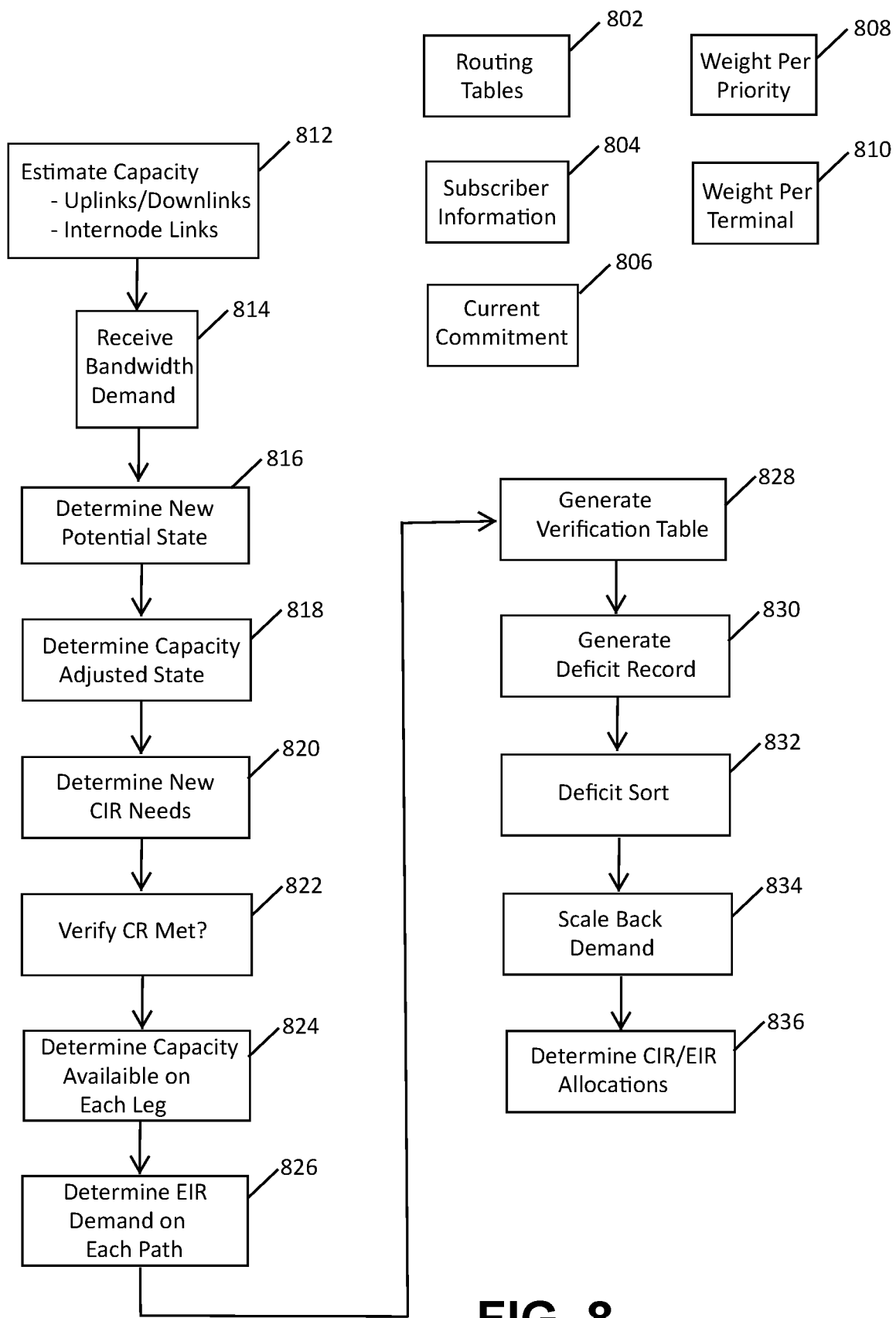
FIG. 8 illustrates a logical flow diagram of example operations associated with one or more processes in bandwidth-constrained moderating of demand, by a resource manager, according to various implementations.

FIG. 8 illustrates a diagram of a logic flow 800 of example operations associated with one or more processes in bandwidth-constrained moderating of demand, such as described above in reference to Tables 1-17. For convenience of supporting graphics, operations will be described in reference to the LEO network system 200, its Resource Manager 210, and Terminals 202, with additional reference to Tables 1-17. Description assumes the Resource Manager 210 stores a routing table 802, which can be arranged generally as illustrated by Table 3, and stores subscriber information, as illustrated by subscriber information block 804, for all of the Terminals 202. Such information can be arranged, for example, as illustrated by Table 4. Description assumes, in addition, that the Resource Manager 210 stores a current commitment record 806, indicating capacity currently utilized by CIR, for each uplink, downlink, and internode connection, such as the example. The record of current commitment 806 can be configured with content such as illustrated in Table 1. Optionally, a weight-per-priority assignment information, such as illustrated by the weight-per-priority block 808, or a weight-per-terminal assignment information, such as illustrated by the weight-per-terminal block 810, or both, can be stored in the Resource Manager 210.

Description of operations of the flow 800 can begin at 812 where the Resource Manager 210 estimates, at a reference time, or time "0," a capacity of the uplinks and downlinks (e.g., UDLs) between Terminals 202 and their corresponding current satellite Node 206, and the capacity of all internode links (e.g., ISLs). Operations at 812 can form a record (not separately visible in FIG. 8) of the estimated uplink, downlink, and internode capacities, for example, as illustrated in Table 2, or equivalents thereof. The Resource Manager 210 can be configured to update the capacity estimates, periodically or upon events, as event driven, as described above. Upon receipt, as illustrated by block 814, of a demand for additional bandwidth from one of the Terminals 202, description of the flow 800 can proceed to 816, which can apply operations in determining a New Potential State, such as described above in reference to Table 8 and elsewhere. As described, operations at 816 can include summing the current commitment bandwidth in the capacity estimate record at 812 with the demand's additional bandwidth. The New Potential State can be used to determine the capacity that would be needed to meet the existing commitments, for example, as reflected by the record of current commitment 806, as well as the new demand.

Upon generation of the New Potential State at 816, description can proceed to 818, where operations can generate a Capacity Adjusted State and store, e.g., in a Resource Manager memory as described in greater detail in later sections, that can reflect the capacity of the network (e.g., the FIG. 2 network) upon taking into account the existing commitments as stored in block 812. Operations at 818 of generating a Capacity Adjusted State are illustrated by the example in Table 9 above, and its Table 8 starting form.

Before proceeding with description, it will be understood that, in an implementation, the Resource Manager 210 can maintain updating of the routing table block 802, the weightper-priority block 808, or the weight-per-terminal block 810, or any combination therefor, while executing other operations the flow 800.

Upon generating the Capacity Adjusted State at 818, description can proceed to 820, where operations can determine new CIR needs, i.e., how much new CIR demand is needed on each path. An example of such operations is illustrated by Table 10 described above. Optionally, a verification process, such as the example named "CIR Met?" and illustrated as block 822, can be applied to check whether all CIR can be met across all paths. An example result of a "CIR Met?" operations at 822 is illustrated in Table 11 above. As also described above, the Table 11 example illustrates a case where CIR can be met across all paths. If operations at 822 show that CIR Met? is not met, additional determinations, for example, similar to those described in greater detail later, for EIR, can be applied to determine the max CIR that can be fit into each path. Assuming, for this example, that operations at 822 indicate that CIR Met? is met, description can proceed to 824 and subsequent blocks to complete the assignments. Operations at 824 can include determining how much capacity is available on each leg (e.g., each path's uplink, ISL(s), and downlink) of the paths after meeting the new CIR obligations. An example of a result of such determination by operations at 824 is illustrated by Table 12 described above.

Upon determining the capacity available on each path leg after meeting the new CIR obligations, description can proceed to 826, where operations can be applied for determining an EIR demand that is needed on each path. Table 13 described above illustrates a result form of operations at 826. Optionally, operations can be applied at 828, in generating a verification table such as, but not limited to, the above-described Table 14 "EIR Not Met," as a record of where the EIR cannot be met. Operations at 828 can be performed, for example, by a processor and memory of the Resource Manager 210, such as described in greater detail in later sections. Upon completion of operations at 828, description of the flow can proceed to 830, where operations can be applied that can form a record of a deficit. The record form can be, for example, as illustrated in Table 15 described above. Upon completion of operations at 830, description of the flow 800 can proceed to 832, where deficit sort operations can be applied to the results of operations at 830, to sort, for example, based on the largest deficit—the bottleneck links in an order according to their relative magnitude. Operations at 830 and 832 can be performed, for example, by the processor and memory of the Resource Manager 210, as described in greater detail in later sections.

Upon determining and sorting the deficits at 830 and 832, description can proceed to 834, where operations for scaling back demand can be applied. Operations at 834 can use the bottleneck information obtained at 830 and 832, and can use terminal weights, e.g., from the weight-per-terminal block 810, to scale back demand to fit the capacity of the bottleneck link. Since operations at 836 scale back on the bottleneck link having the largest deficit, extra bandwidth can be made available on other links with a smaller deficit bottleneck, for other flows. Referring to Table 16 an example of extra bandwidth being made available is that Up-S1 for A-B was able to send at 30 instead of 25 due to bottleneck link of S4-Down limiting A-C to 20.

It will be understood that that example did not need to utilize the feature of scaling back based on the largest deficit bottleneck. Operations at 834 can include visiting each bottleneck link, to limit allocation to within that capacity.

In an aspect, upon or associated with completing the scale-back operations at 834, description can proceed to 836, where operations can be applied to determine actual CIR/EIR allocations to each terminal and each destination. Table 17, described above, shows one example of such a determination. A technical element of this feature is the provision of an actual bandwidth (burst plan assignment) to the terminals, for future use.

Figure 9:
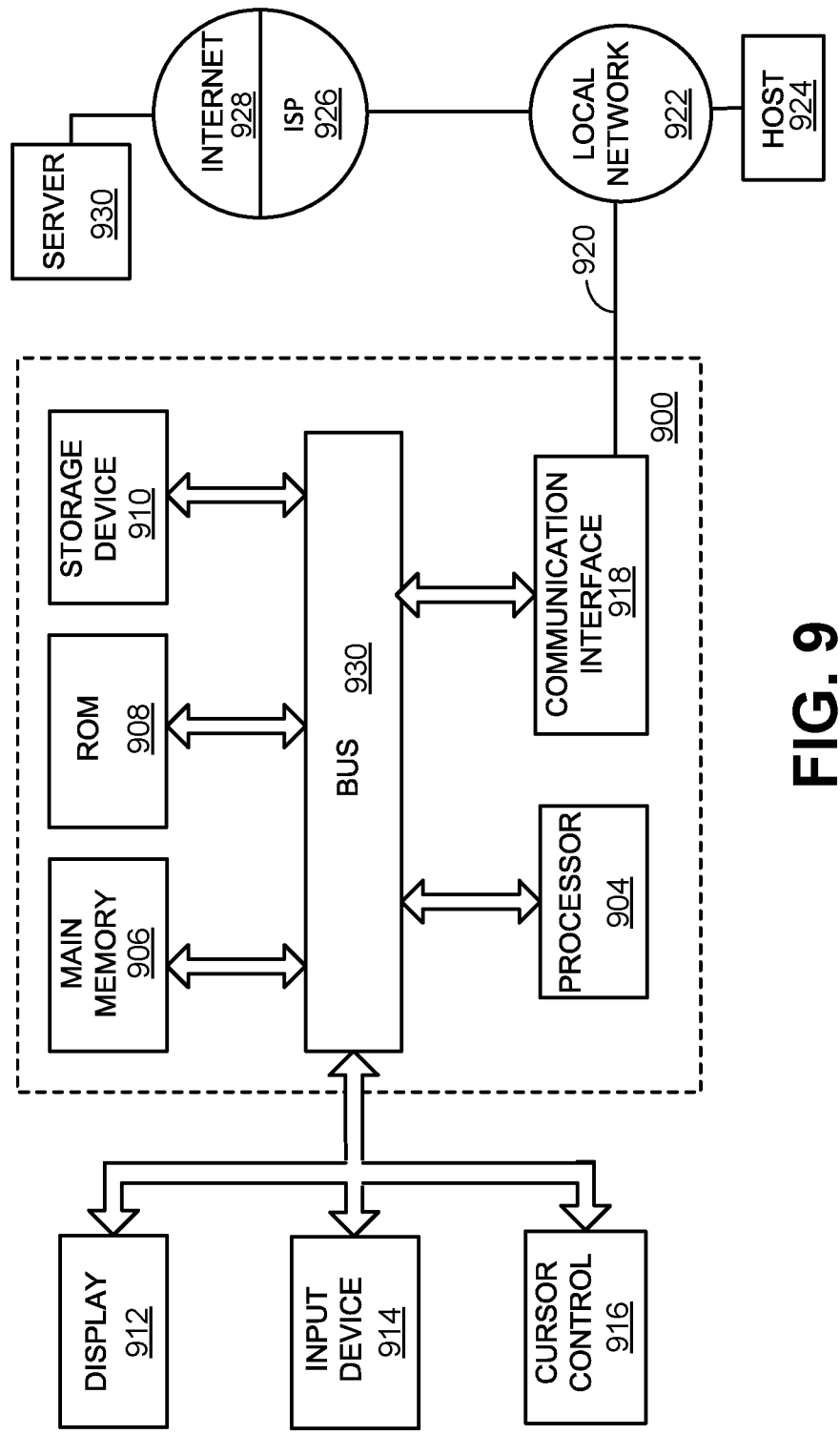
FIG. 9 illustrates a block diagram that illustrates a computer system upon which aspects of this disclosure may be implemented.

FIG. 9 is a block diagram illustrating a computer system 900 upon which aspects of this disclosure may be implemented, such as, but not limited to the processes described at FIGS. 4, 5, 6, 7, and 8. Computer system 900 may include a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 may be used for storing temporary variables or other intermediate information during execution of instructions to be executed by processor 904. Computer system 900 can include a read only memory (ROM) 908 or other static storage device coupled to bus 902 for storing static information and instructions for processor 904. A storage device 910, such as a magnetic disk or optical disk, can be coupled to bus 902 for storing information and instructions.

Computer system 900 may be coupled via bus 902 to a display 912, such as a cathode ray tube (CRT) or liquid crystal display (LCD), for displaying information to a computer user. An input device 914, including alphanumeric and other keys, can be coupled to bus 902 for communicating information and command selections to processor 904. A cursor control 916, such as a mouse, a trackball, or cursor direction keys can be included, for communicating direction information and command selections to processor 904 and for controlling cursor movement on display 912. The cursor control 916 can provide two degrees of freedom in two axes, a first axis (e.g., x) and a second axis (e.g., y), that allows the device to specify positions in a plane. In an aspect, a touchscreen (not separately visible in FIG. 9) can combine display 912 with hardware that registers touches upon display 912.

In an aspect, processor 904 can execute one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In some examples, hard-wired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operation in a specific fashion. Forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

In some examples implemented using computer system 900, various machine-readable media are involved, for example, in providing instructions to processor 904 for execution. Such a medium may take many forms, including but not limited to, non-volatile media, volatile media, and transmission media. Non-volatile media includes, for example, optical or magnetic disks. Volatile media includes such dynamic memory. Transmission media includes coaxial cables, copper wire and fiber optics, including the wires that comprise bus 902. Transmission media can also take the form of acoustic or light waves, such as those generated during radio wave and infrared data communications. All such media must be tangible to enable the instructions carried by the media to be detected by a physical mechanism that reads the instructions into a machine.

Various forms of machine-readable media may be involved in carrying one or more sequences of one or more instructions to processor 904 for execution. For example, the instructions may initially be carried on a magnetic disk of a remote computer. The remote computer can load the instructions into its dynamic memory and send the instructions over, for example, a telephone line using a modem. A modem local to computer system 900 can receive the data on the telephone line and use, for example, an infrared transmitter to convert the data to an infrared signal. An infrared detector can receive the data carried in the infrared signal and appropriate circuitry can place the data on bus 902. Bus 902 can carry the data to main memory 906, from which processor 904 retrieves and executes the instructions. The instructions received by main memory 906 may optionally be stored on storage device 410 either before or after execution by processor 904.

Computer system 900 can include a communication interface 918 coupled to bus 602, to provide a two-way data communication coupling to a network link 920 that is connected to a local network 922. The communication interface 918 may be, for example, an integrated services digital network (ISDN) card or a modem to provide a data communication connection to a corresponding type of telephone line.

Network link 920 can provide data communication through one or more networks to other data devices. Network link 920 may provide a connection through local network 922 to a host computer 924 or to data equipment operated by an Internet Service Provider (ISP) 926. ISP 926 can provide data communication services through "Internet" 928. Local network 922 and Internet 928 can use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. The received code can be executed by processor 904 as it is received, and/or stored in storage device 910, or other non-volatile storage for later execution. Computer system 900 may obtain such code in the form of a carrier wave.

One example equivalent computer system upon which aspects of this disclosure such as, but not limited to the processes described at FIGS. 4, 5, 6, 7, and 8, can be implemented can include one or more computer systems, such as the computer system 900 or portions thereof, as an equivalent processor 904, a wide area network (WAN), such as the Internet, as an equivalent bus 902, and a distributed memory resource, for example, one or more databases hosted on one or more servers interconnected through the WAN, as an equivalent main memory 906.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify nature of disclosed subject matter. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A user terminal apparatus for profile based ingress management, comprising:
   a processor;
   a memory coupled to the processor, the memory configured to store instructions that, when executed by the processor, cause the processor to:
   store in the memory an ingress bandwidth profile, the ingress bandwidth profile including an ingress bandwidth profile parameter,
   receive a packet having an indication of a priority level,
   determine whether the packet is within the ingress bandwidth profile, and based at least in part on a result of the determining whether the packet is within the ingress bandwidth profile being that the packet is within the ingress bandwidth profile, to:
      enqueue the packet in a priority queue, in accordance with the priority level,
      determine whether a bandwidth allocation update is required and,
      based at least in part on a result of the determining whether the bandwidth allocation update is required, to:
         schedule the packet for a transmission, and
         transmit the packet, based at least in part on the schedule;
      selectively bypass, based at least in part on a rule or trigger condition,
      determine whether another packet is within the ingress bandwidth profile,
      enqueue the other packet in the priority queue, in accordance with the priority level,
      determine whether a bandwidth allocation update is required and, based at least in part on the bandwidth allocation update being determined as not required, to:
         schedule the other packet for a transmission, and
         transmit the other packet, based at least in part on the schedule.

2. A user terminal apparatus in accordance with claim 1 for profile based ingress management, wherein the result of the determining whether the bandwidth allocation update is required is that the bandwidth allocation update is not required.

3. A user terminal apparatus in accordance with claim 1 for profile based ingress management, wherein the instructions also include instructions that, when executed by the processor, cause the processor, based at least in part on the result of the determining whether the packet is within the ingress bandwidth profile being that the packet is not within the ingress bandwidth profile, to discard the packet.

4. A user terminal apparatus in accordance with claim 1 for profile based ingress management, wherein to determine whether the packet is within the ingress bandwidth profile includes to:
   determine an ingress classification of the packet, and
   apply the ingress bandwidth profile to the determined ingress classification.

5. A user terminal apparatus in accordance with claim 1 for profile based ingress management, wherein the instructions also include instructions that when executed by the processor cause the processor to:
   determine, in association with enqueuing the packet in the priority queue, a fill state of the priority queue, wherein:
   to determine whether a bandwidth allocation update is required is based at least in part on the fill state of the priority queue.

6. A user terminal apparatus in accordance with claim 5 for profile based ingress management, wherein the instructions also include instructions that when executed by the processor cause the processor, in association with determining that the bandwidth allocation is required, to:
   evaluate a state of the user terminal, and
   send a bandwidth request to an external resource manager, based at least in part on the evaluated state.

7. A user terminal apparatus in accordance with claim 6 for profile based ingress management, wherein the instructions also include instructions that when executed by the processor cause the processor, in response to receipt of a bandwidth allocation corresponding to the bandwidth request, to:
   schedule the packet for transmission, and
   transmit the packet, based at least in part on the schedule.

8. A user terminal apparatus in accordance with claim 6 for profile based ingress management, wherein the instructions also include instructions that when executed by the processor cause the processor to proceed, based at least in part on sending the bandwidth request to the external resource manager, to
   schedule the packet for transmission, and
   transmit the packet, based at least in part on the schedule.

9. A user terminal apparatus in accordance with claim 1 for profile based ingress management, wherein the instructions also include instructions that when executed by the processor cause the processor, in association with determining that bandwidth allocation is required, to:
   evaluate a state of the user terminal,
   send a bandwidth request to an external resource manager, based at least in part on the evaluated state,
      schedule the packet for transmission, and
      transmit the packet, based at least in part on the schedule.

10. A method for profile based user terminal management of ingress, comprising:
   receiving a packet having an indication of a priority level; and
   determining whether the packet is within an ingress bandwidth profile, and
   based at least in part on a result of the determining whether the packet is within the ingress bandwidth profile being that the packet is within the ingress bandwidth profile:
      enqueuing the packet in a priority queue, in accordance with the priority level,
      determining whether a bandwidth allocation update is required and,
   based at least in part on a result of the determining whether the bandwidth allocation update is required:
   scheduling the packet for a transmission, and
   transmitting the packet, based at least in part on the schedule;
   selectively, based at least in part on a rule or trigger condition,
      bypassing determining whether another packet is within the ingress bandwidth profile,
      enqueuing the other packet in the priority queue, in accordance with the priority level, determining whether another bandwidth allocation update is required and, based at least in part on the other bandwidth allocation update being determined as not required:
  scheduling the other packet for transmission, and transmitting the other packet, based at least in part on the schedule.

11. A method in accordance with claim 10 for profile based user terminal management of ingress, wherein the result of the determining whether the bandwidth allocation update is required is that the bandwidth allocation update is not required.

12. A method in accordance with claim 10 for profile based user terminal management of ingress, wherein the method further comprises: based at least in part on the result of the determining whether the packet is within the ingress bandwidth profile being that the packet is not within the ingress bandwidth profile, discarding the packet.

13. A method in accordance with claim 10 for profile based user terminal management of ingress, wherein determining whether the packet is within the ingress bandwidth profile includes:
  retrieving the ingress bandwidth profile from a storage or via a link;
  determining an ingress classification of the packet, and
  applying the ingress bandwidth profile to the determined ingress classification.

14. A method in accordance with claim 10 for profile based user terminal management of ingress, wherein the method further includes:
  determining, in association with enqueuing the packet in the priority queue, a fill state of the priority queue,
  wherein:
  determining whether bandwidth allocation update is required is based at least in part on the fill state of the priority queue.

15. A method in accordance with claim 14 for profile based user terminal management of ingress, wherein the method further includes, in association with determining that bandwidth allocation:
  evaluating a state of the user terminal, and
  sending a bandwidth request to an external resource manager, based at least in part on the evaluated state.

16. A method in accordance with claim 15 for profile based user terminal management of ingress, wherein the method further includes, in response to receiving a bandwidth allocation in response to the bandwidth request:
  scheduling the packet for transmission, and
  transmitting the packet, based at least in part on the schedule.

17. A method in accordance with claim 16 for profile based user terminal management of ingress, wherein the method further includes, based at least in part on sending the bandwidth request to the external resource manager:
  scheduling the packet for transmission, and
  transmitting the packet, based at least in part on the schedule.

* * * * *